United States Patent
Kim et al.

(10) Patent No.: US 10,843,019 B2
(45) Date of Patent: Nov. 24, 2020

(54) BRANCH TEE FOR SPRINKLER PIPES CONTROLLING WATER STREAM AUTOMATICALLY AND SPRINKLER PIPE SYSTEM HAVING THE SAME

(71) Applicant: Jin Tai Kim, Seoul (KR)

(72) Inventors: Jin Tai Kim, Seoul (KR); Song Yi Kim, Seoul (KR); Seung Yun Kim, Seoul (KR)

(73) Assignee: Jin Tai Kim, Seoul (KR)

( * ) Notice: Subject to any disclaimer, the term of this patent is extended or adjusted under 35 U.S.C. 154(b) by 111 days.

(21) Appl. No.: 15/756,013

(22) PCT Filed: Aug. 29, 2016

(86) PCT No.: PCT/KR2016/009562
§ 371 (c)(1),
(2) Date: Feb. 27, 2018

(87) PCT Pub. No.: WO2017/034382
PCT Pub. Date: Mar. 2, 2017

(65) Prior Publication Data
US 2018/0243596 A1    Aug. 30, 2018

(30) Foreign Application Priority Data

Aug. 27, 2015  (KR) .................. 10-2015-0120877
Aug. 19, 2016  (KR) .................. 10-2016-0105678

(51) Int. Cl.
*A62C 35/58*   (2006.01)
*A62C 35/68*   (2006.01)
(Continued)

(52) U.S. Cl.
CPC .............. *A62C 35/68* (2013.01); *A62C 35/58* (2013.01); *A62C 37/08* (2013.01); *F16K 11/02* (2013.01);
(Continued)

(58) Field of Classification Search
CPC ......... A62C 35/68; A62C 35/58; A62C 37/08; F16K 11/02; F16K 11/07; F16K 15/025;
(Continued)

(56) References Cited

U.S. PATENT DOCUMENTS

| 4,013,088 A * | 3/1977 | Gocke ..................... E03C 1/106 137/115.16 |
| 6,357,467 B1 * | 3/2002 | Ringer ................... A62C 35/68 137/119.01 |
| 2005/0081928 A1 * | 4/2005 | Burke .................. F02M 63/005 137/601.18 |

FOREIGN PATENT DOCUMENTS

| JP | 06-050667 U | 7/1994 |
| JP | 2001-340485 A | 12/2001 |

(Continued)

OTHER PUBLICATIONS

International Search Report for PCT/KR2016/009562 dated Dec. 13, 2016.

*Primary Examiner* — Tuongminh N Pham
(74) *Attorney, Agent, or Firm* — Hauptman Ham, LLP

(57) ABSTRACT

Provided are a branch tee for sprinkler pipes, which is capable of selectively sprinkling fire extinguishing water only on a fire occurrence area and preventing the skipping effect although there are many obstacles to sprinkling water or a distance between sprinkler heads is narrow, and a sprinkler pipe system including the branch tee. The branch tee for sprinkler pipes includes a branch tee body (9) having a cylindrical shape, a first outlet (11) disposed on one end of the branch tee body (9) and connected to a pipe of a closed sprinkler head, an inlet (10) disposed on the branch tee body (9) and connected to a water supply pipe, a second outlet (12) disposed on the branch tee body (9) and connected to a pipe of an open sprinkler head, a piston valve disposed in the branch tee body (9) and simultaneously controlling (Continued)

opening and closing of each of the first outlet (11) and the second outlet (12) while moving in a longitudinal direction of the branch tee body (9) due to a fluid pressure difference in the branch tee body (9) when fire occurs, and an inner wall groove (18) defined in an inner wall of the branch tee body (9) between the piston valve and the first outlet (11).

7 Claims, 34 Drawing Sheets

(51) Int. Cl.
*A62C 37/08* (2006.01)
*F16L 41/02* (2006.01)
*F16L 41/03* (2006.01)
*F16K 15/02* (2006.01)
*F16K 11/02* (2006.01)
*F16K 11/07* (2006.01)
*F16K 17/04* (2006.01)

(52) U.S. Cl.
CPC ............ *F16K 11/07* (2013.01); *F16K 15/025* (2013.01); *F16K 17/0473* (2013.01); *F16L 41/02* (2013.01); *F16L 41/021* (2013.01); *F16L 41/03* (2013.01)

(58) Field of Classification Search
CPC .. F16K 15/02; F16K 17/0473; F16K 11/0716; F16L 41/021; F16L 41/03
See application file for complete search history.

(56) References Cited

FOREIGN PATENT DOCUMENTS

| | | |
|---|---|---|
| JP | 2005-000508 A | 1/2005 |
| KR | 10-2004-0015548 A | 2/2004 |
| KR | 10-1200621 B1 | 11/2012 |

* cited by examiner

PRIOR ART

PRIOR ART

BRANCH TEE FOR SPRINKLER PIPES CONTROLLING WATER STREAM AUTOMATICALLY AND SPRINKLER PIPE SYSTEM HAVING THE SAME

CROSS REFERENCE TO RELATED APPLICATION

This present application is a national stage filing under 35 U.S.C § 371 of PCT application number PCT/KR2016/009562 filed on Aug. 29, 2016 which is based upon and claims the benefit of priority to Korean Patent Application Nos. 10-2015-0120877 filed on Aug. 27, 2015 and Korean Patent Application Nos. 10-2016-0105678 filed on Aug. 19, 2016 in the Korean Intellectual Property Office. The disclosures of the above-listed applications are hereby incorporated by reference herein in their entirety.

TECHNICAL FIELD

The present invention relates to a branch tee for sprinkler pipes and a sprinkler pipe system including the same, and more particularly, to a branch tee for sprinkler pipes automatically controlling water stream and a sprinkler pipe system including the same.

BACKGROUND ART

A sprinkler is an automatic fire extinguishing device for fire suppression. The sprinkler operates in such a manner that, when fire occurs, as a fire extinguishing pump compresses fire extinguishing water, and, as a water flow detection device opens a main valve, the fire extinguish water is sprinkled through a head. The sprinkler head is classified into two kinds on the basis of whether heat sensing part for sensing fire occurrence is disposed. That is, the sprinkler head is classified into a closed sprinkler head including a heat sensing part sensing hot fire heat to open the head and an open sprinkler head that determines whether water sprinkling is performed according to opening and closing of a valve by a sensor in a state in which a water discharging hole is always opened without an additional heat sensing part.

In case of water sprinkling equipment using the open sprinkler head, since a plurality of open sprinkler heads are installed in a specific area and then water sprinkling is performed over the entire area, a time for required to suppress fire is extremely short, and the fire suppression is effectively performed. However, when a valve is opened due to malfunction of the sensor, damage caused by the water may be severe.

Accordingly, the closed sprinkler head is increasingly demanded. When fire occurs, heat moves upwards to form a ceiling jet flow. Thus, the closed sprinkler head is required to be installed within about 30 cm from a ceiling to open the head by the hot ceiling jet flow. However, malfunction caused by the skipping effect that disturbs head opening in case of fire occurrence is generated even in the closed sprinkler head. The skipping effect is a phenomenon in which water discharged from a sprinkler head that is firstly opened when fire occurs directly wet surrounding heads, or discharged water drops are attached to the surrounding heads to cool the heat sensing part while moving upwards along a plume flow that is generated when fire occurs, thereby disturbing opening of the surrounding heads. Also, as micro-water drops sprinkled from the firstly opened sprinkler head cools the surrounding hot jet flow, they may interfere with the opening of the surrounding heads.

The skipping effect frequently occurs when the closed heads are extremely adjacent to each other. To prevent the above-described phenomenon, National fire protection association (NFPA) recommends that the closed heads are installed while maintaining a minimum spaced distance equal to or greater than about 1.8 m in case of a general head and equal to or greater than about 2.4 m in case of an early suppression fast response (ESFR) head. Accordingly, although there are many combustible products in a place, the closed heads may not be densely installed, and thus, water sprinkling density may not be sufficiently high.

Hereinafter, a limitation of a typical closed sprinkler head will be described in detail with reference to FIGS. 1A and 1B. FIGS. 1A and 1B are views illustrating a closed sprinkler pipe system according to a prior art. FIG. 1A illustrates an upward head, and FIG. 1B illustrates a downward head (dry pendent head).

In a place such as an underground parking lot, in which there is an obstacle to sprinkling water, e.g., all sorts of pipes and a cable tray, a sprinkler head is necessarily installed on each of upper and lower portions of the obstacle to sprinkling water for equally sprinkling water over an entire region when fire occurs. Referring to FIGS. 1A and 1B, a closed sprinkler head 1 is installed on upper and lower portions of an obstacle to sprinkling water 7. Since a hot ceiling jet flow is generated due to fire heat when fire occurs, an upper head 1 is firstly opened, and then a lower head 1 is expected to be soon opened when the fire is further progressed. Meanwhile, a baffle plate 2 is installed above the lower head 1 like an umbrella in order to prevent the below lower head 1 from being disturbed to be opened because water drops sprinkled from the firstly opened upper head 1 makes the lower head 1 to be wet. Although the baffle plate 2 may protect the lower head 1 from being directly wet, the skipping effect is still generated because the water drops sprinkled from the upper head 1 cool a ceiling jet flow around the lower head 1.

Besides, in case of FIG. 1A, an enough ceiling height may be hardly secured in an underground parking lot due to the pipes constructed downward for the lower head 1, and, although installed, the appearance is not fine, and the piping construction requires high personnel expenses. Regarding reference numerals that are not described, reference numeral 3 indicates a water supply pipe, reference numeral 4 indicates a water drain valve, reference numeral 6 indicates a ceiling, and reference numeral 7 indicates pipes that are sprinkling obstacles.

Also, in case of FIG. 1B, since a dry pendent head 1 for freeze protection is used, a water drain valve may be unnecessary and a head may be downwards constructed to secure relatively enough ceiling height. However, high construction costs are required due to the expensive dry pendent head. Reference numeral 5 that is not described indicates a dry pendent head body.

In case of a rack-type warehouse as another example of a place having the obstacle to sprinkling water, since a ceiling height is great and products stacked on racks that are vertically arranged, effective water sprinkling is difficult. To overcome the above-described limitation, an in-rack sprinkler head to which a baffle plate is originally attached is installed, or an early suppression fast response (ESFR) head sprinkling a big-size water drop that is not flown along the plume flow in case of a warehouse having a ceiling height equal to or less than about 13.7 m. However, the sprinkler head is necessarily installed only on the ceiling because still the skipping effect is not prevented, fire suppression efficiency is remarkably reduced due to the many obstacles to sprinkling water.

DISCLOSURE OF THE INVENTION

Technical Problem

The present invention provides a branch tee for sprinkler pipes, which is capable of selectively sprinkling fire extinguishing water only on a fire occurrence area and preventing the skipping effect although there are many obstacles to sprinkling water or a distance between sprinkler heads is narrow.

The present invention also provides a sprinkler pipe system including the above-described branch tee.

The objects of the present invention are not limited to the aforementioned object, but other objects not described herein will be clearly understood by those skilled in the art from descriptions below.

Technical Solution

An embodiment of the inventive concept provides a branch tee for sprinkler pipes, which automatically controls water stream, including: a branch tee body 9 having a cylindrical shape; a first outlet 11 disposed on one end of the branch tee body 9 and connected to a pipe of a closed sprinkler head; an inlet 10 disposed on the branch tee body 9 and connected to a water supply pipe; a second outlet 12 disposed on the branch tee body 9 and connected to a pipe of an open sprinkler head; a piston valve disposed in the branch tee body 9 and simultaneously controlling opening and closing of each of the first outlet 11 and the second outlet 12 while moving in a longitudinal direction of the branch tee body 9 due to a fluid pressure difference in the branch tee body 9 when fire occurs; and an inner wall groove 18 defined in an inner wall of the branch tee body 9 between the piston valve and the first outlet 11. Here, the piston valve includes: a main blocking member 14a covering an inside of the branch tee, which is adjacent to the first outlet 11, when fire does not occur; and a sub-blocking member 14b connected to the main blocking member to cover an inside of the branch tee, which is adjacent to the second outlet 12 when fire does not occur.

In an embodiment, when the closed sprinkler head is opened in case of fire occurrence, the piston valve may moves towards the first outlet 11 due to the fluid pressure difference in the branch tee body 9, the main blocking member 14a may overlap the inner wall groove 18 to define a flow path along an edge of the main blocking member 14a, and the sub-blocking member 14b may open the second outlet 12.

In an embodiment, the branch tee may further include a spring 20 disposed between the first outlet 11 and the main blocking member 14a.

In an embodiment, the branch tee may further include a micro through-hole 16 passing through the main blocking member 14a for pressure balance in the branch tee body 9.

In an embodiment, the inlet may be disposed on the other end of the branch tee body, and at least one second outlet may be disposed on a sidewall of the branch tee body.

In an embodiment, the piston valve may have a shape of a mini-cylinder, the main blocking member may include a disk plate covering an inside of the mini-cylinder, and the sub-blocking member may include a sidewall of the mini-cylinder.

In an embodiment, an opening defining a flow path above and below the main blocking member may be defined in the sidewall of the mini-cylinder.

In an embodiment, the inlet may be disposed on a sidewall of the branch tee body, and at least one second outlet may be disposed on the other end of the branch tee body.

In an embodiment, the main blocking member may include a disk covering the first outlet, and the sub-blocking member may include a disk covering between the inlet and the second outlet.

In an embodiment, the branch tee may further include an additional blocking member connected to the sub-blocking member and directly covering the second outlet.

In an embodiment of the inventive concept, a sprinkler pipe system includes: the branch tee; a water supply pipe connected to the inlet of the branch tee; a closed sprinkler head connected to the first outlet of the branch tee through a pipe; and an open sprinkler head connected to the second outlet of the branch tee through a pipe. Here, when the closed sprinkler head is opened in case of fire occurrence, the first outlet and the second outlet are opened at the same time due to a fluid pressure difference in the branch tee.

Particularities of other embodiments are included in the detailed description and drawings.

Advantageous Effects

As described above, the following excellent effects may be achieved by the branch tee for sprinkler pipes according to the present invention and the sprinkler pipe system including the same.

First, since the present invention uses the closed sprinkler head as the main head, the water sprinkling may be locally performed only on the fire occurrence area, and thus, flood damage on a fire non-occurrence area may be minimized.

Second, the present invention may effectively suppress fire in a place requiring high water sprinkling density due to many obstacles to sprinkling water or many combustible products without the skipping effect. The present invention has a structure using the closed sprinkler head and the open sprinkler head as the main head and the sub-head, respectively, with the branch tee capable of controlling water stream therebetween, so that the sub-head automatically sprinkles water when the main head is opened to sprinkle water. Accordingly, as the main head is installed around a ceiling, and the sub-head is disposed between the racks in the rack-type warehouse having the rack structure, the obstacles to sprinkling water may be effectively overcome.

For another example, in a place in which the fire load is high, and there are many obstacles to sprinkling water in a wide area such as a parking lot, although the closed sprinkler heads (main heads) are spaced a predetermined distance, the open sprinkler heads (sub-heads) operating with the main head to automatically sprinkle water are installed between the main heads, the sprinkler heads may be densely disposed to enhance the water sprinkling density.

Furthermore, the present invention may prevent combustion from expanding to the upper floor due to flame erupted through windows when fire occurs in a high-rise building or fire from expanding to the adjacent room through an opening of a wall, through which a conveyor belt passes in a working place.

Third, according to the present invention, since the ceiling height of a building may be maximally lowered within a range under the provision of the law, the total construction costs may be saved. The minimum height from the parking lot ground to the ceiling facilities (typically, sprinkler pipes or sprinkler heads) in an underground parking lot of a building is defined in Korean law. For example, a passage has a minimum height equal to or greater than about 2.3 m, and a parking area has a minimum height equal to or greater than about 2.1 m. According to the present invention, since the open sprinkler head is used as the sub-head that is disposed at a relatively lower position among the main head and the sub-head, an additional drain valve or baffle plate is unnecessary. Thus, since the ceiling height may be lowered, the construction costs may be reduced, and aesthetic appearance may be achieved.

MODE FOR CARRYING OUT THE INVENTION

Figure 1A:
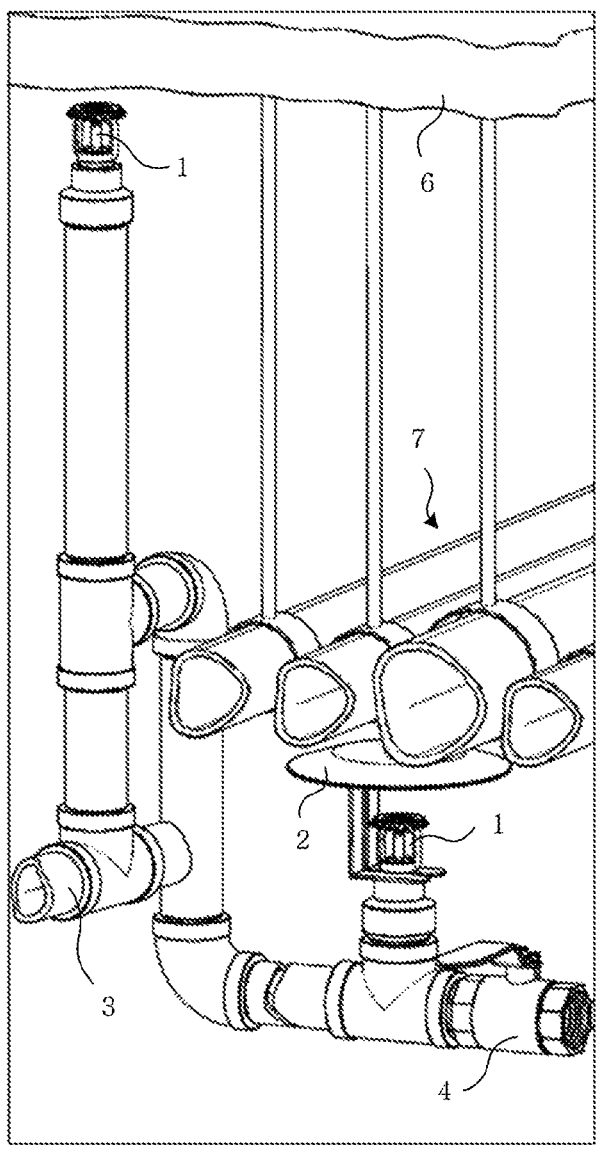
FIGS. 1A and 1B are views illustrating a closed sprinkler pipe system according to a prior art.
Figure 1B:
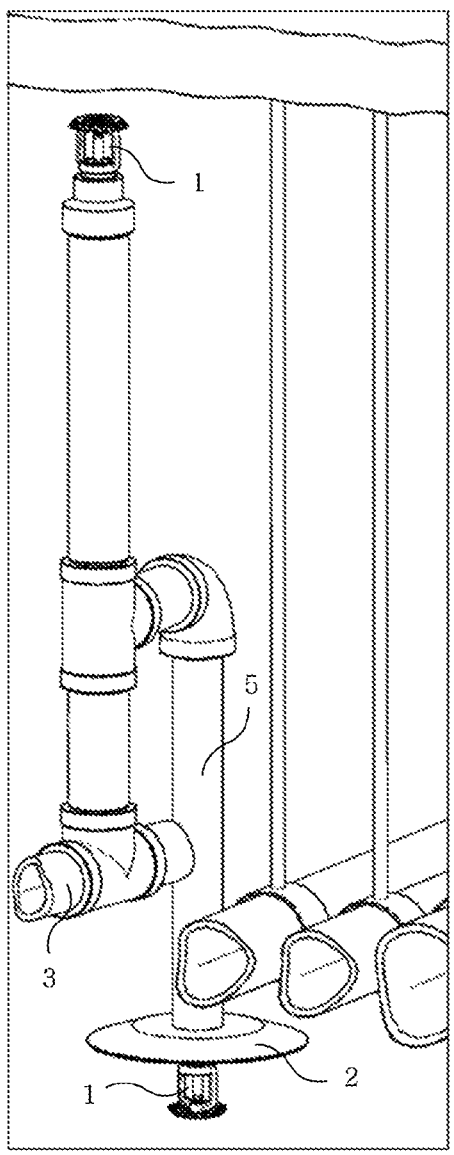

Advantages and features of the present disclosure, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

A branch tee disclosed in embodiment of the present invention refers to a pipe joint for connecting at least three pipes to each other. Although a T-type branch tee is exemplarily described in embodiments of the present invention, the embodiment of the present invention is not limited to the shape of the branch tee.

Figure 2:
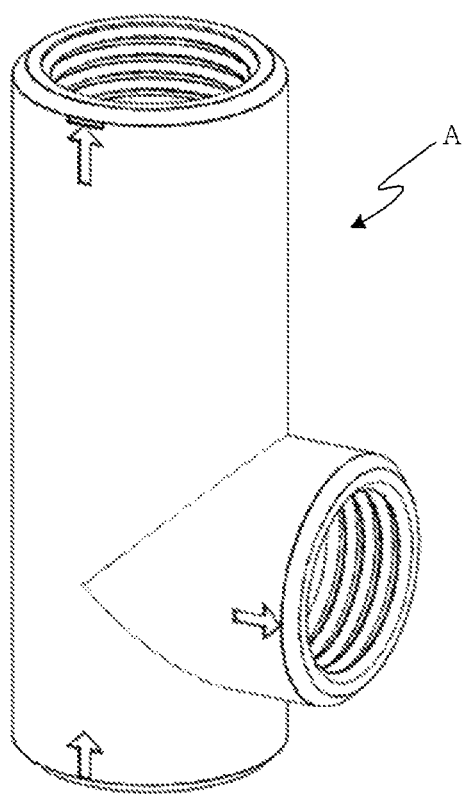
FIG. 2 is a perspective view illustrating a branch tee for sprinkler pipes according to a first embodiment of the present invention.
Figure 3A:
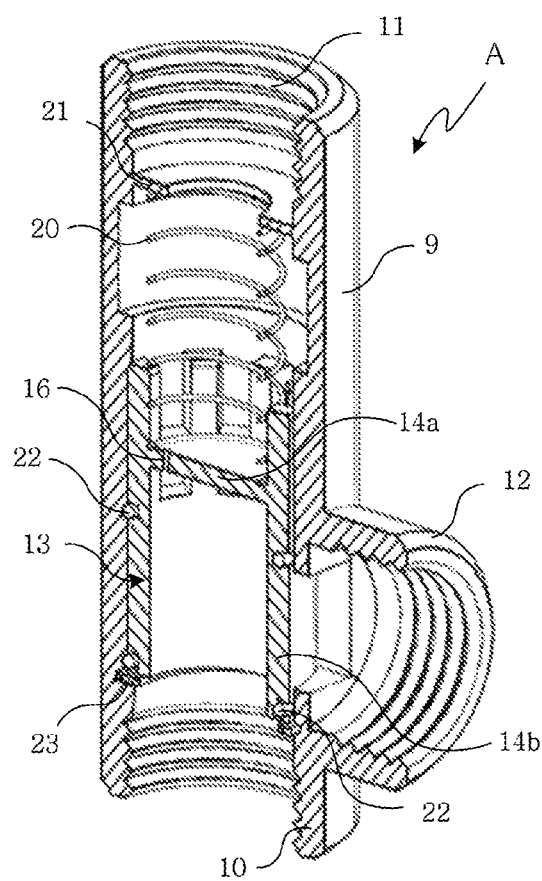
FIGS. 3A and 3B are longitudinal cut-away views illustrating the branch tee in FIG. 2.
Figure 3B:
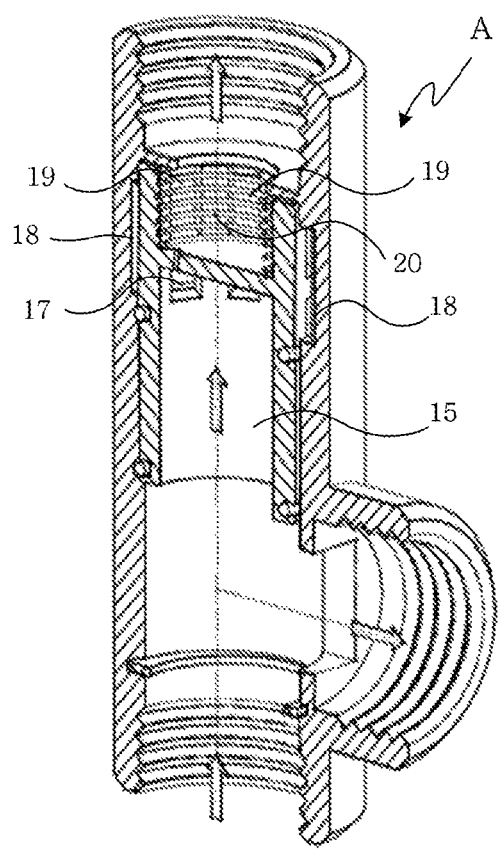
Figure 4A:
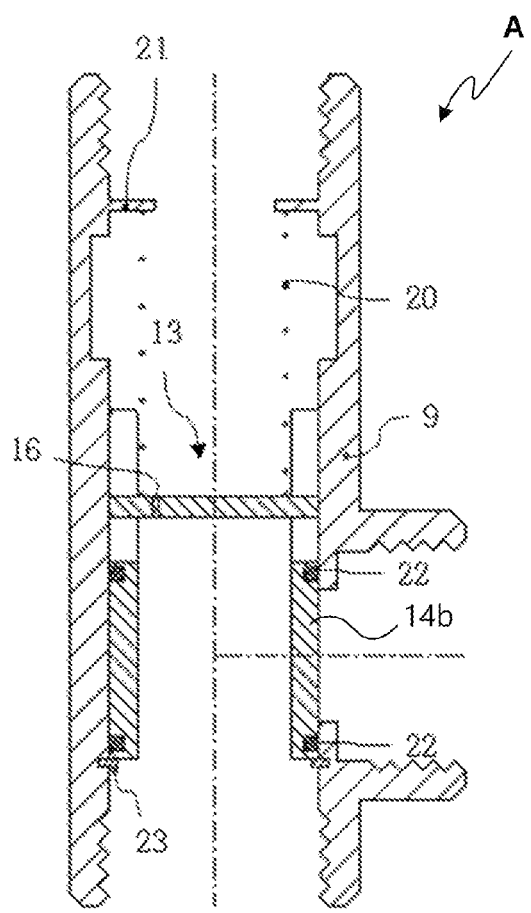
FIGS. 4A and 4B are longitudinal cross-sectional views illustrating the branch tee in FIG. 2.
Figure 4B:
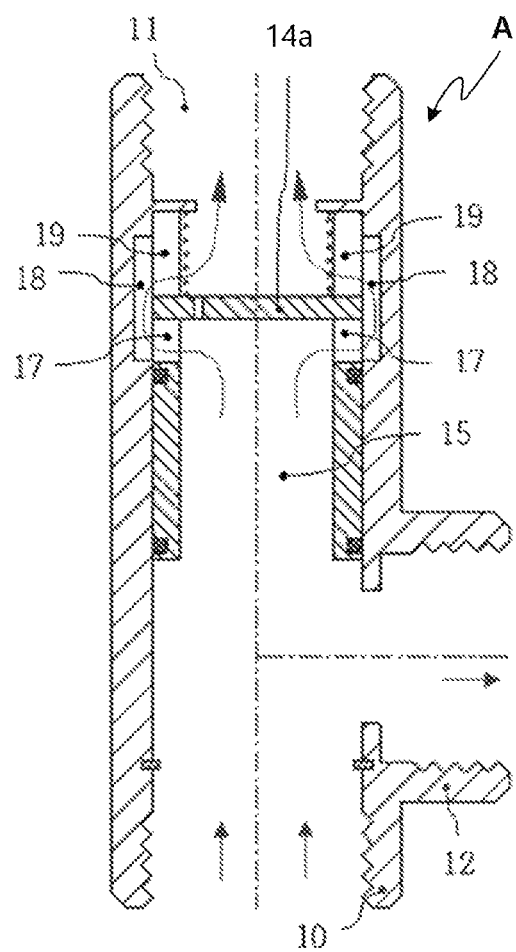
Figure 5:
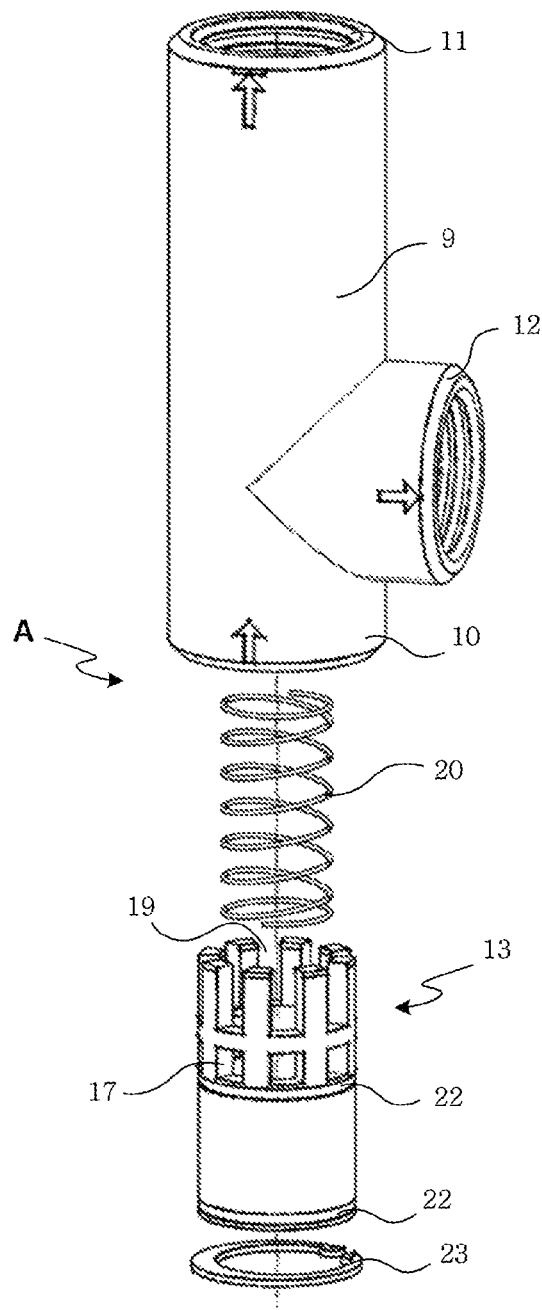
FIG. 5 is an exploded perspective view illustrating the branch tee in FIG. 2.
Figure 6A:
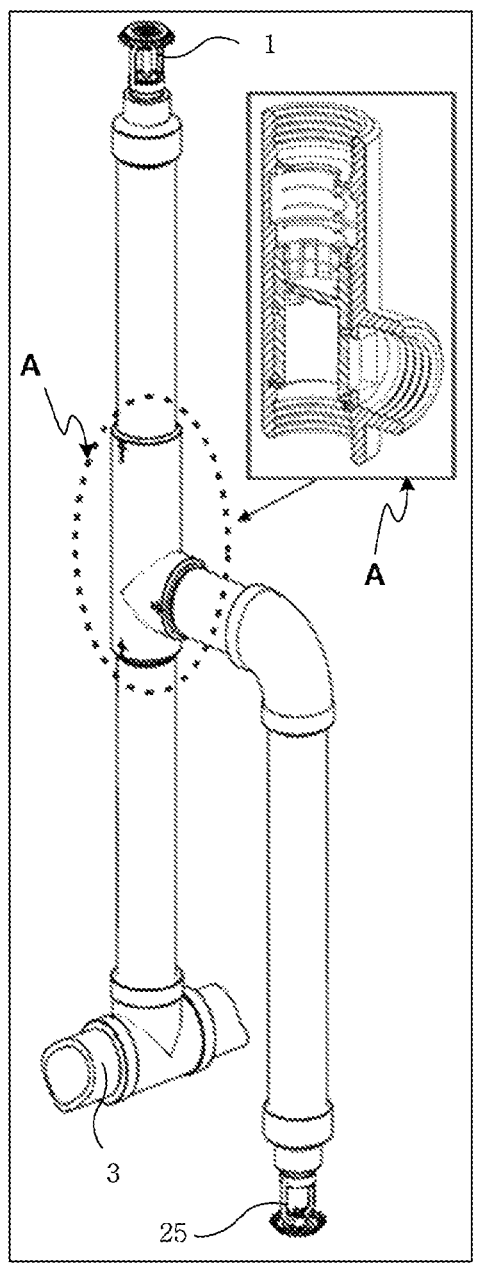
FIGS. 6A and 6B are piping diagrams illustrating a sprinkler pipe system in which the branch tee in FIG. 2 is installed.
Figure 6B:
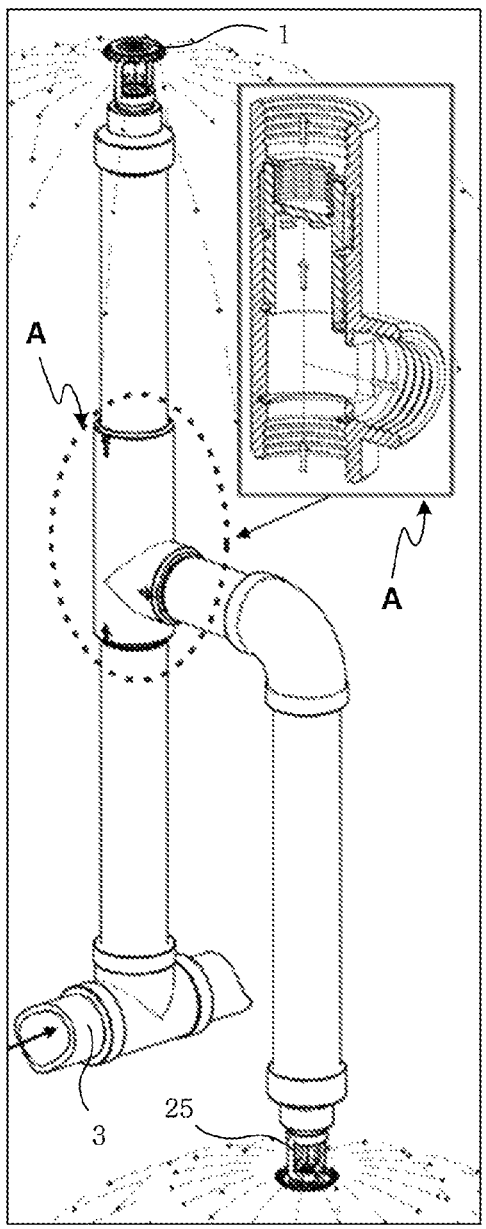
Figure 7:
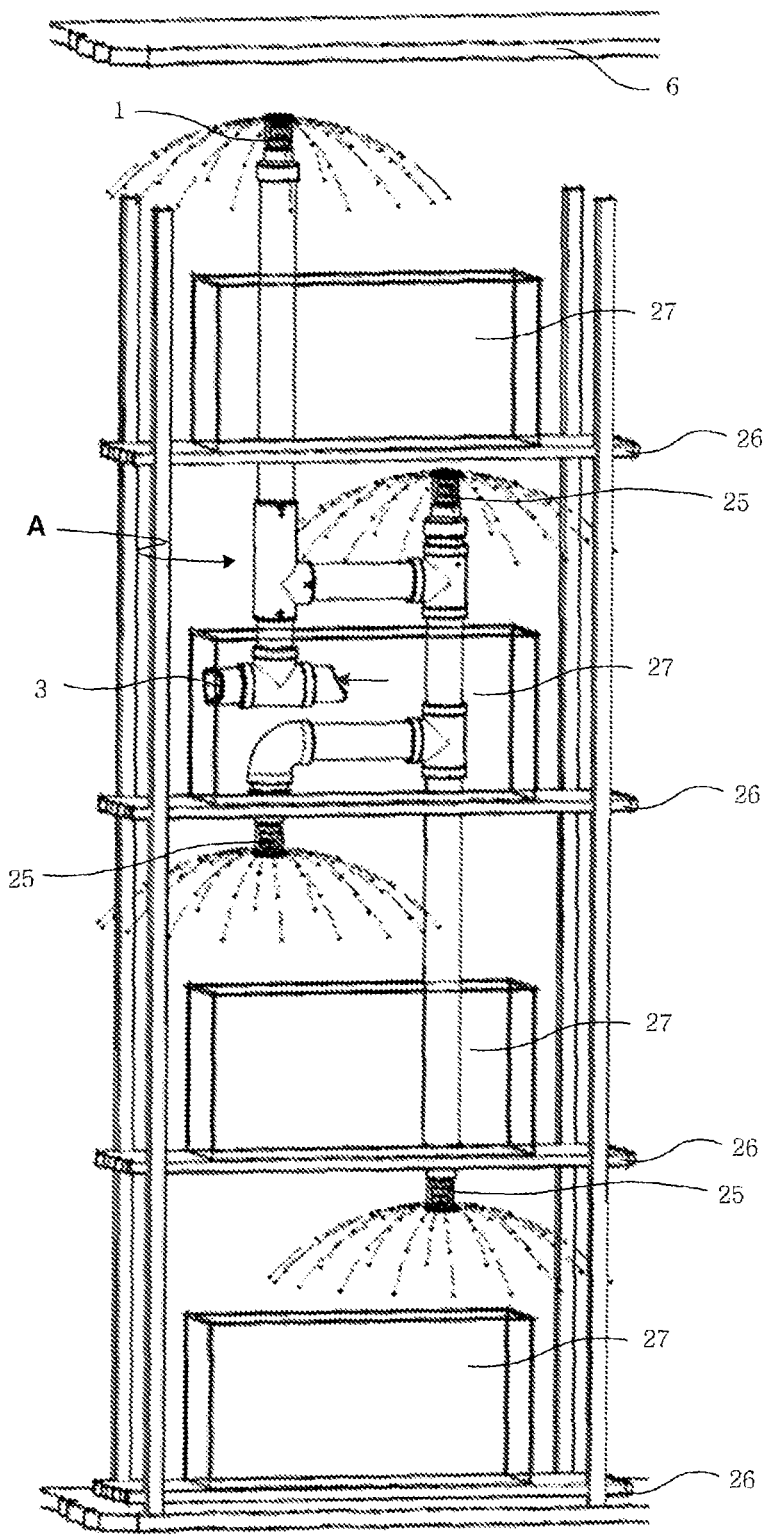
FIG. 7 is a view illustrating a state in which the sprinkler pipe system according to the first embodiment of the present invention is applied to a rack-type warehouse with high fire load.

Hereinafter, referring to FIGS. 2 to 7, a branch tee for sprinkler pipes according to a first embodiment of the present invention and a sprinkler pipe system including the same will be described. Here, FIG. 2 is a perspective view illustrating the branch tee for sprinkler pipes according to the first embodiment of the present invention, FIGS. 3A and 3B are longitudinal cut-away views illustrating the branch tee in FIG. 2, FIGS. 4A and 4B are longitudinal cross-sectional views of the branch tee in FIG. 2, and FIG. 5 is an exploded perspective view of the branch tee in FIG. 2. FIGS. 6A and 6B are piping diagrams illustrating a sprinkler pipe system in which the branch tee in FIG. 2 is installed, and FIG. 7 is a view illustrating a state in which a sprinkler pipe system according to the first embodiment of the present invention is applied in a rack-type warehouse with high fire load. (Here, FIGS. 3A, 4A, and 6A illustrate a state in which a sprinkler head is closed at normal times, and FIGS. 3B, 4B, and 6B illustrate a state in which the sprinkler head is opened when fire occurs.)

As illustrated in FIGS. 2 to 5, a branch tee A for sprinkler pipes according to the embodiment includes a branch tee body 9, a first outlet 11, an inlet 10, a second outlet 12, a piston valve 13, and an inner wall groove 18.

Specifically, the branch tee body 9 has an overall shape of a cylinder, and the first outlet 11 is disposed on one end of the branch tee body 9. The first outlet 11 is connected to a pipe of a closed sprinkler head, and fire extinguishing water is transferred to the closed sprinkler head through the first outlet 11. Here, the closed sprinkler head (refer to reference numeral 1 in FIGS. 6A and 6B) includes a heat sensing part capable of sensing hot fire heat and sprinkles fire extinguishing water by opening the head when fire occurs.

The inlet 10 is disposed on the other end of the branch tee body 9. The inlet 10 is connected to the water supply pipe (refer to reference numeral 3 in FIGS. 6A and 6B) and receives the fire extinguishing water. The water supply pipe 3 is connected to a fire extinguishing pump or a pipe of waterworks.

The second outlet 12 is disposed on a sidewall of the branch tee body 9. The first outlet 12 is connected to a pipe of a closed-type sprinkler head, and fire extinguishing water is transferred to the closed-type sprinkler head through the first outlet 12. Here, the open sprinkler head (refer to reference numeral 25 in FIGS. 6A and 6B) does not include a heat sensing part and determines whether water is sprinkled by opening and closing a valve according to fire occurrence while always opening a water sprinkling hole. The open sprinkler head has a dry-type pipe.

The piston valve 13 is disposed in the branch tee body 9 and simultaneously controls opening and closing of the first outlet 11 and the second outlet 12 while moving in a longitudinal direction of the branch tee body 9 due to a fluid pressure difference in the branch tee body 9 when fire occurs. Specifically, the piston valve 13 includes a main blocking member 14a controlling opening and closing of the first outlet 11 and a sub-blocking member 14b controlling opening and closing of the second outlet 12.

Specifically, the piston valve 13 may have an overall shape of a mini-cylinder so that the piston valve 13 substantially closely contacts an inner circumferential surface of the branch tee body 9. The main blocking member 14a may include a disk plate disposed in a transverse direction in the mini-cylinder and block the fire extinguishing water in a direction from the inlet 10 to the first outlet 11 in the branch tee. Accordingly, the main blocking member 14a may determine whether the closed sprinkler head sprinkles the fire extinguishing water. The sub-blocking member 14b may include the sidewall of the min-cylinder and cover the inside of the branch tee adjacent to the second outlet 12 at normal times or when fire does not occur, as illustrated in FIGS. 3A, 4A, and 6A. Accordingly, the sub-blocking member 14b may determine whether the open sprinkler head sprinkles the fire extinguishing water.

Also, openings 17 and 19 for defining a flow path in upper and lower portions of the main blocking member 14a are defined in the sidewall of the mini-cylinder constituting the piston valve 13. The openings 17 and 19 operate with the inner wall groove 18 to define a flow path that is continuously defined from the inlet 10 to the first outlet 11. The inner wall groove 18, which is defined in the inner wall of the branch tee body 9, is disposed between the piston valve 13 and the first outlet 11. The inner wall groove 18 may be integrated with the inner wall along a circumference thereof or defined by a combination of a plurality of separated grooves.

A micro through-hole 16, which passes through the main blocking member 14a, serves to maintain the same pressure on the upper and lower portions of the main blocking member 14a when fire does not occur, i.e., a state in which the closed sprinkler head is closed.

A spring 20 is disposed between the first outlet 11 and the piston valve 13 or between the first outlet 11 and the main blocking member 14a. When the inside of the branch tee body 9 is in a static pressure, the piston valve 13 moves toward the inlet 10 due to an elastic force of the spring 20, and the sub-blocking member 14b covers the second outlet 12. A spring stopper 21 is provided on an inner circumferential surface of the branch tee body 9 between the first outlet 11 and the inner wall groove 18 to fix an upper end of the spring 20. However, the embodiment of the present invention is not limited thereto. Although the stopper 21 is not separately provided, the substantially same effect may be achieved through a coupling relationship with an external pipe. For example, when the pipe of the closed sprinkler head is screw-coupled to a screw groove defined in the inner circumferential surface of the first outlet 11, the pipe of the closed sprinkler head plays the substantially same role as the spring stopper 21.

At least one O-ring 22 is provided on an outer circumferential surface of the piston valve 13 to prevent the fire extinguishing water from being leaked from the inlet 10 to the first outlet 11 or the second outlet 12 at normal times.

A snap ring 23 is installed on the inner circumferential surface, which is adjacent to the inlet 10, of the branch tee body 9 to prevent the piston valve 13 from moving downward, thereby preventing separation of the piston valve 13. However, the embodiment of the present invention is not limited thereto. Although the snap ring 23 is not separately provided, the substantially same effect may be achieved through a coupling relationship with an external pipe. For example, when the water supply pipe is screw-coupled to the screw groove defined in the inner circumferential surface of the inlet 10, the water supply pipe may play the substantially same role as the snap ring 23. Also, as illustrated in FIG. 5, when the spring 20, the piston valve 13, and the snap ring 23 are sequentially assembled through the inlet 10, the branch tee A according to the embodiment may be easily assembled. Here, the spring 20 and the piston valve 13 may be fixed to the inside of the branch tee body 9 by the spring stopper 21 and the snap ring 23. The snap ring 23 may be inserted and fixed to the groove defined in the inner wall of the branch tee body 9.

Referring to FIGS. 6A and 6B, the sprinkler pipe system includes: the branch tee A; the water supply pipe connected to the inlet of the branch tee A; the closed sprinkler head 1 connected to the first outlet of the branch tee A through a pipe; and the open sprinkler head 25 connected to the second outlet of the branch tee A through a pipe. The pipe system according to the present invention uses the closed sprinkler head as a main head for sensing whether fire occurs and the open sprinkler head as a sub-head that operates with the main head to automatically sprinkle the fire extinguishing water.

Hereinafter, the operation of the branch tee for sprinkler pipes according to the present invention will be described.

Since the closed sprinkler head 1 is shut off at normal times or when fire does not occurs, as illustrated in FIGS. 3A, 4A, and 6A, the overall inside of the branch tee body 9 has a constant pressure, and the piston valve 13 moves toward the inlet 10 due to the pressure of the spring 20. Here, the main blocking member 14a shuts-off the inside, which heads toward the first outlet 11, of the branch tee, and the sub-blocking member 14b shuts-off the inside, which is adjacent to the second outlet 12, of the branch tee.

When the closed sprinkler head 1 is opened when fire occurs, as illustrated in FIGS. 3B, 4B, and 6B, the inner pressure of the first outlet 11 decreases, and, due to a fluid pressure difference in the branch tee body 9, the piston valve 13 moves toward the first outlet 11. When the main blocking member 14a moves upwards and stops at a position overlapping the inner wall groove 18, a flow path is defined along an edge of the main blocking member 14a. Specifically, the flow path is defined in a sequence of the opening 17, the inner wall groove 18, and the opening 19. At the same time, as the sub-blocking member 14b moves toward the first outlet 11, the second outlet 12 is opened.

As illustrated in FIG. 7, when the sprinkler pipe system according to the present invention is applied to the rack-type warehouse with high fire load, fire may be effectively distinguished. That is, typically, when a combustible product 27 is stacked on a rack 26 having a plurality of stories, fire may not be effectively distinguished due to the skipping effect and an obstacle to sprinkling water. However, according to the present invention, as the closed sprinkler head 1 is installed around the ceiling 6 to easily detect the ceiling jet flow caused by fire heat, and, therebelow, the open sprinkler head 25 operating together with the closed sprinkler head 1 is installed by using the branch tee A according to the present invention, fire may be suppressed regardless of the skipping effect and the obstacle to sprinkling water.

Figure 8A:
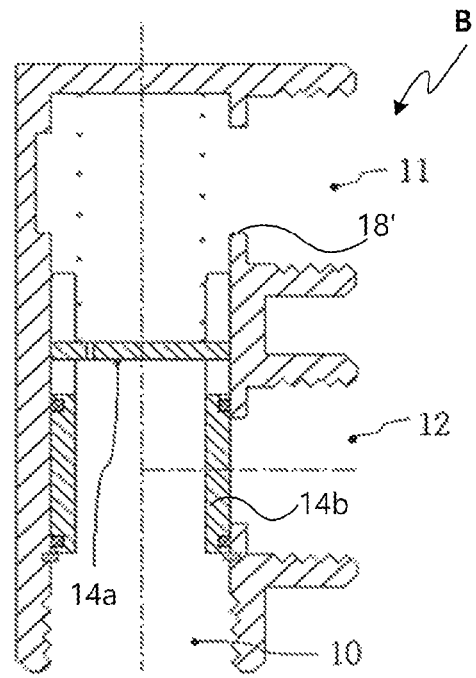
FIGS. 8A and 8B, which are modified examples of FIGS. 4A and 4B, are longitudinal cross-sectional views illustrating a branch tee for sprinkler pipes according to a second embodiment of the present invention.
Figure 8B:
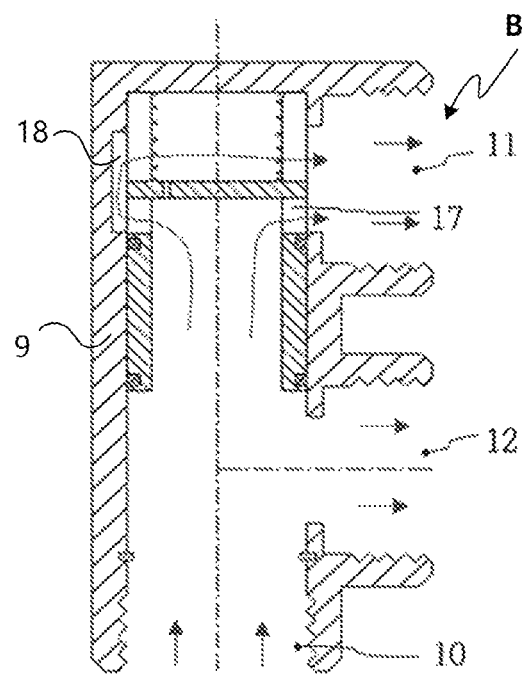

Hereinafter, a branch tee for sprinkler pipes according to a second embodiment of the present invention will be described with reference to FIGS. 8A and 8B. FIGS. 8A and 8B, which are modified examples of FIGS. 4A and 4B, are longitudinal cross-sectional views illustrating the branch tee for sprinkler pipes according to the second embodiment of the present invention. Different points from the first embodiment (refer to FIGS. 2 to 7) will be mainly described for convenience of description.

As illustrated in FIGS. 8A and 8B, in case of a branch tee B according to the embodiment, a first outlet 11, which is connected to the closed sprinkler head, is disposed on a sidewall of one end of a branch tee body 9. Preferably, the first outlet 11 may overlap an inner wall groove 18. In the embodiment, when a piston valve 13 moves upwards due to fire occurrence, since openings 17 and 19 of the piston valve 13 are directly connected to the first outlet 11, fire extinguishing water may be more smoothly transferred to the first outlet 11. Although the inner wall groove 18 is additionally defined in the inner circumferential surface of the branch tee body 9 in the embodiment, the embodiment of the present invention is not limited thereto. For example, the first outlet 11 or a passage 18' connected to the first outlet 11 may correspond to the inner wall groove 18.

Figure 9:
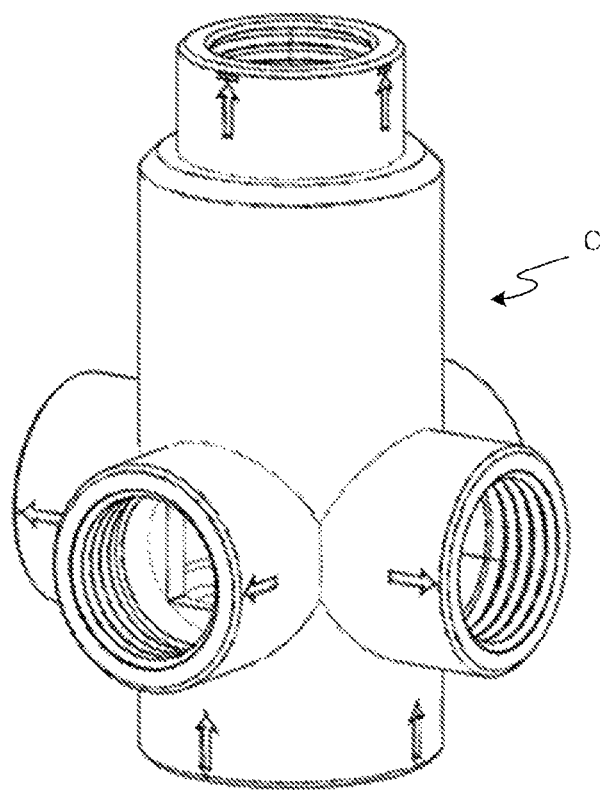
FIG. 9 is a perspective view illustrating a branch tee for sprinkler pipes according to a third embodiment of the present invention.
Figure 10A:
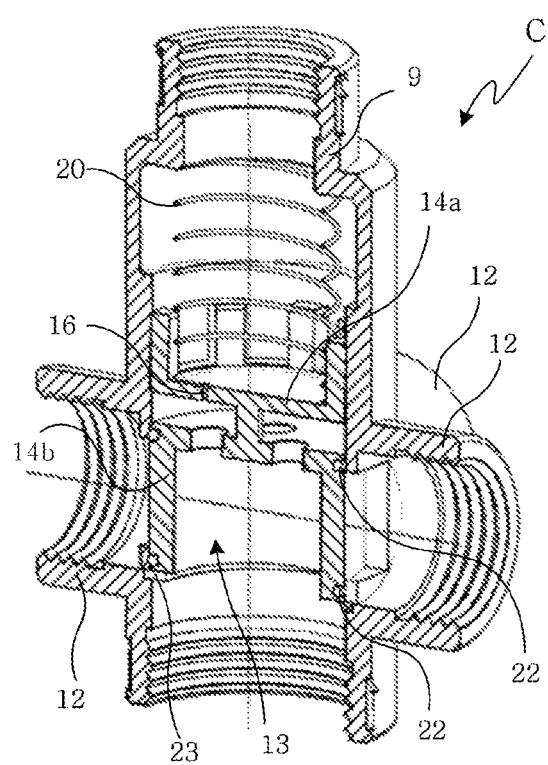
FIGS. 10A and 10B are longitudinal cut-away views illustrating the branch tee in FIG. 9.
Figure 10B:
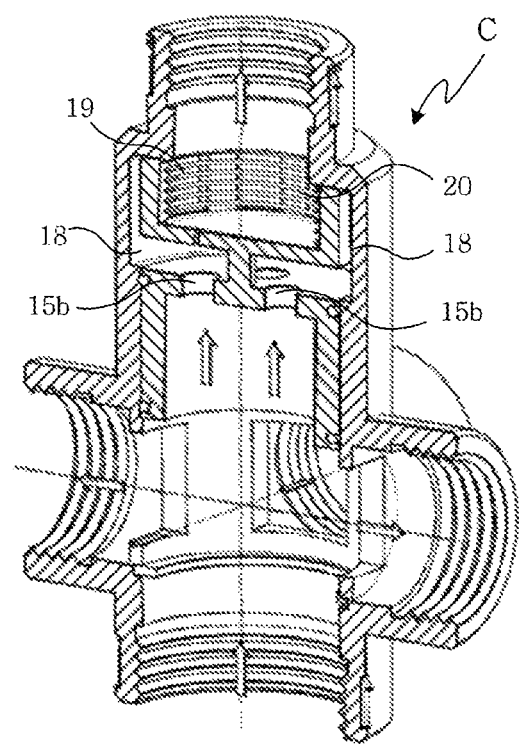
Figure 11A:
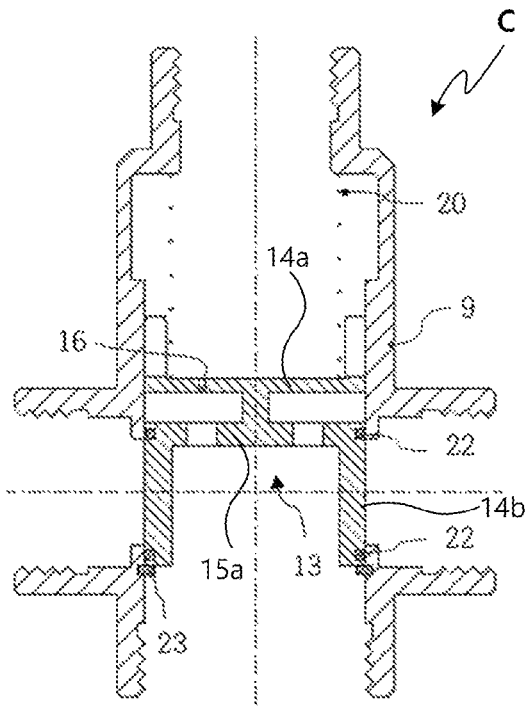
FIGS. 11A and 11B are longitudinal cross-sectional views illustrating the branch tee in FIG. 9.
Figure 11B:
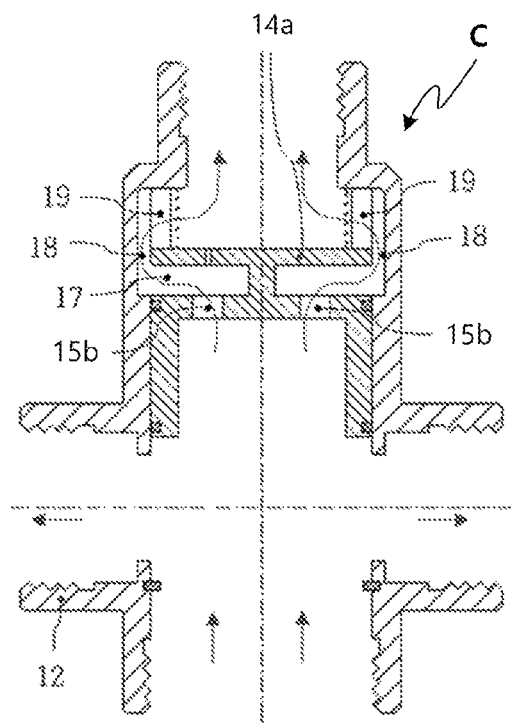
Figure 12:
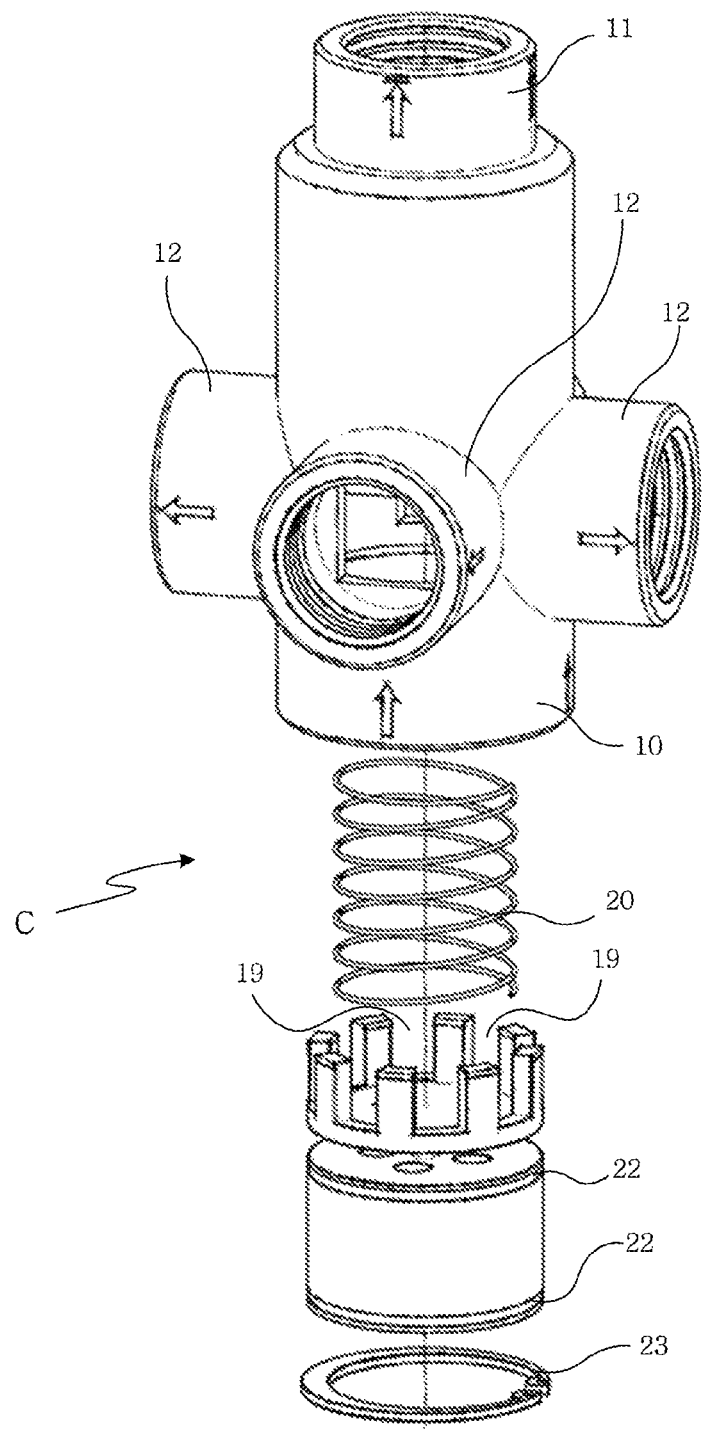
FIG. 12 is an exploded perspective view illustrating the branch tee in FIG. 9.
Figure 13:
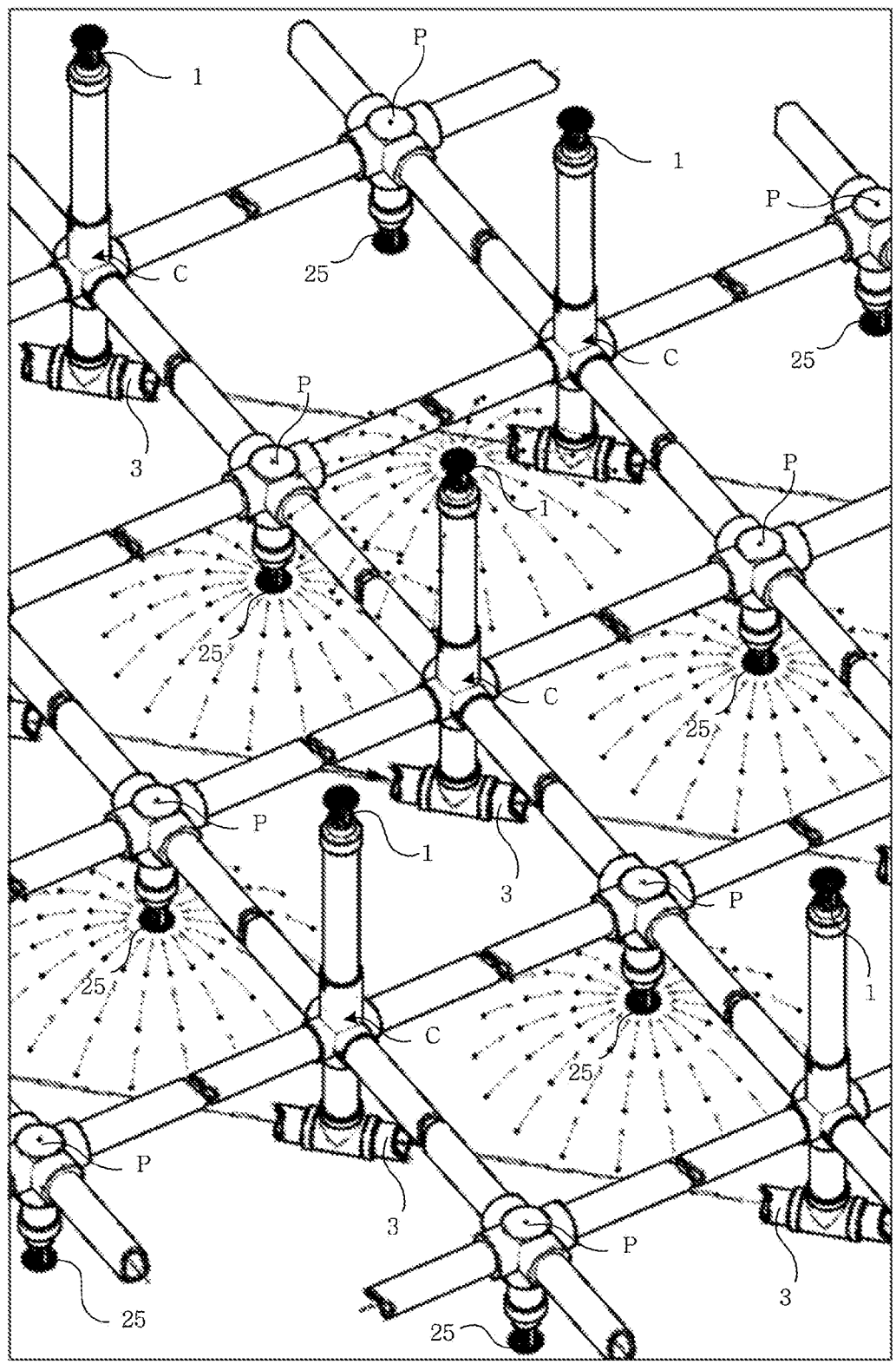
FIG. 13 is a piping diagram illustrating a sprinkler pipe system in which the branch tee in FIG. 9 is installed.

Hereinafter, a branch tee for sprinkler pipes according to a third embodiment of the present invention and a sprinkler pipe system including the same will be described with reference to FIGS. 9 to 13. Here, FIG. 9 is a perspective view illustrating the branch tee for sprinkler pipes according to the third embodiment of the present invention, FIGS. 10A and 10B are longitudinal cut-away views of the branch tee in FIG. 9, FIGS. 11A and 11B are longitudinal cross-sectional views of the branch tee in FIG. 9, and FIG. 12 is an exploded perspective view of the branch tee in FIG. 9. FIG. 13 is a piping diagram of a sprinkler pipe system in which the branch tee in FIG. 9 is installed. Different points from the first embodiment (refer to FIGS. 2 to 7) will be mainly described for convenience of description.

As illustrated in FIGS. 9 to 12, a branch tee C for sprinkler pipes according to the embodiment includes a plurality of second outlet 12 disposed on the sidewall of a branch tee body 9. Although four second outlets 12 are exemplarily described in the embodiment, the embodiment of the present invention is not limited to the number of the second outlets 12.

Also, although a piston valve 13 according to the embodiment has the substantially same function as the previous embodiment, the shape thereof is slightly modified. That is, openings 17 defined in a sidewall of the piston valve 13 are overall connected to each other. To this end, an additional disk 15a disposed parallel to a main blocking member 14a and coupled to the main blocking member 14a through a connecting member is provided below the main blocking member 14a. Also, a sub-blocking member 14b is disposed below the additional disk 15a and coupled to an edge of the additional disk 15a. At least one opening 15b is defined in the additional disk 15a.

When the piston valve 13 moves toward a first outlet 11 in case of fire occurrence, fire extinguishing water introduced from an inlet 10 is discharged to the first outlet 11 through the opening 15b, an opening 17, an inner wall groove 18, and an opening 19. Besides, the fire extinguishing water is discharged to a plurality of second outlets 12.

Referring to FIG. 13, the closed sprinkler heads 1 are arranged while being spaced a predetermined distance from each other in a place having many combustible products therein and thus having high possibility of fire occurrence, e.g., an underground parking lot and a warehouse to prevent the skipping effect. The branch tee C is coupled to a lower portion of the pipe of the closed sprinkler head 1. A dry-type pipe is connected to the branch tee C in a horizontal direction through four second outlets 12. Also, a water supply pipe 3 is connected to the inlet 10 disposed on a lower portion of the branch tee C. The four dry-type pipes are gathered through a connecting pipe P. The connecting pipe P includes four inlets in a horizontal direction and an outlet in a downward direction. An open sprinkler head 25 is installed on the outlet of the connecting pipe P.

According to the embodiment, when the closed sprinkler head 1 is firstly opened due to high heat of the ceiling jet flow in case of fire occurrence, the second outlet 12 of the branch tee C is also opened. Accordingly, since one closed sprinkler head 1 disposed on the ceiling and four open sprinkler head 25 disposed around the closed sprinkler head 1 sprinkle fire extinguishing water together, the skipping effect may be prevented, and the sprinkler heads may be densely arranged to enhance a water sprinkling density.

Figure 14:
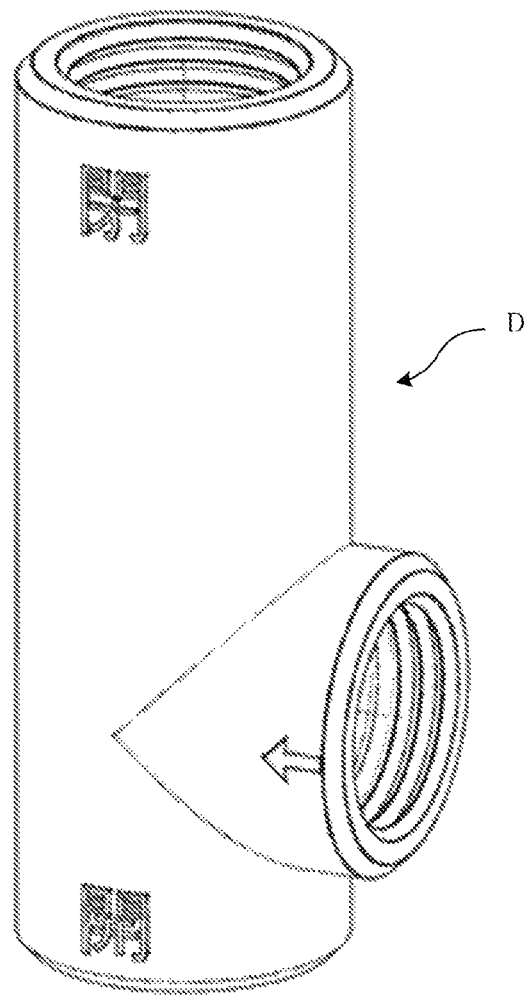
FIG. 14 is a perspective view illustrating a branch tee for sprinkler pipes according to a fourth embodiment of the present invention.
Figure 15A:
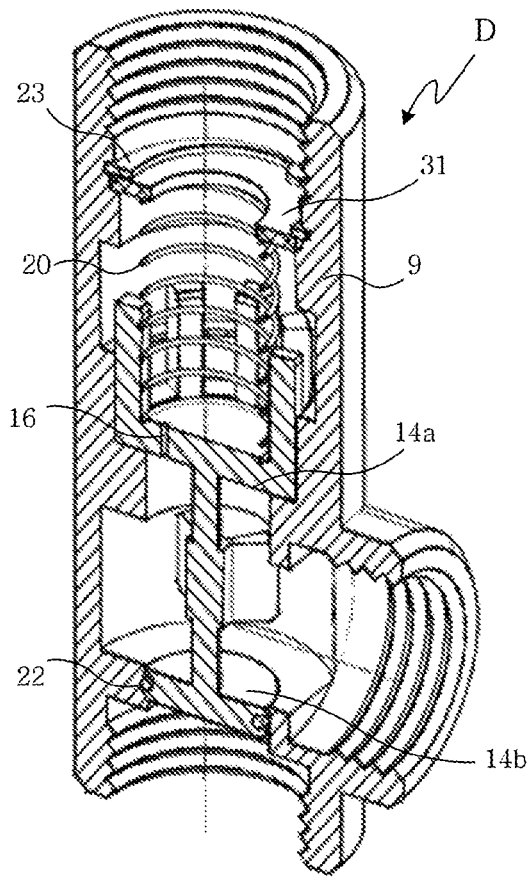
FIGS. 15A and 15B are longitudinal cut-away views illustrating the branch tee in FIG. 14.
Figure 15B:
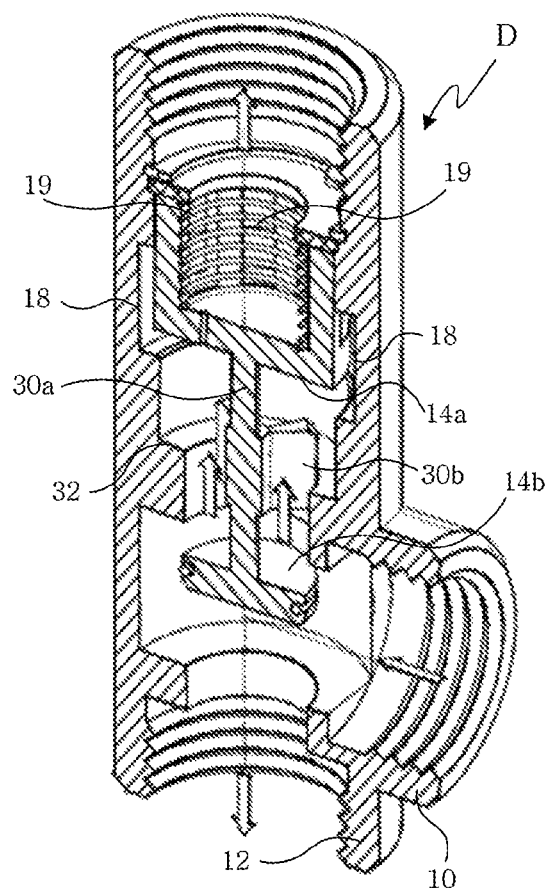
Figure 16A:
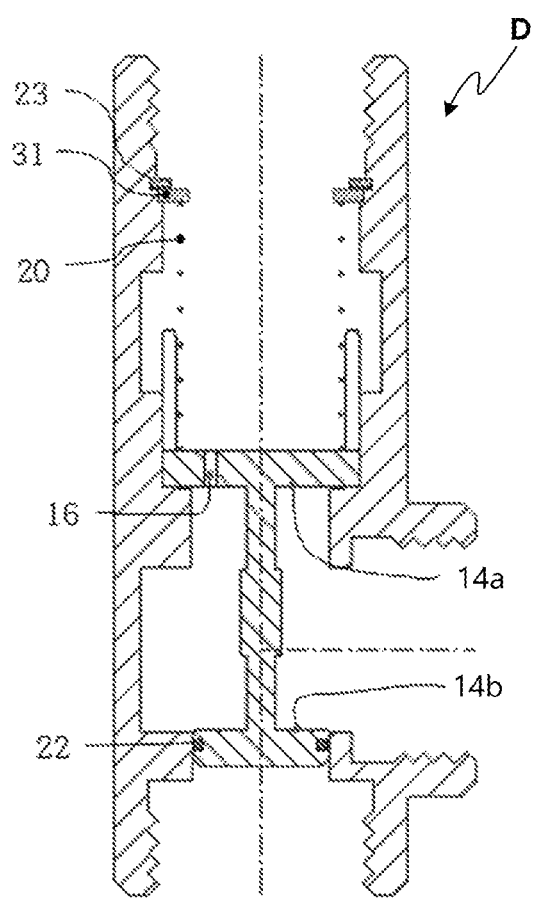
FIGS. 16A and 16B are longitudinal cross-sectional views illustrating the branch tee in FIG. 14.
Figure 16B:
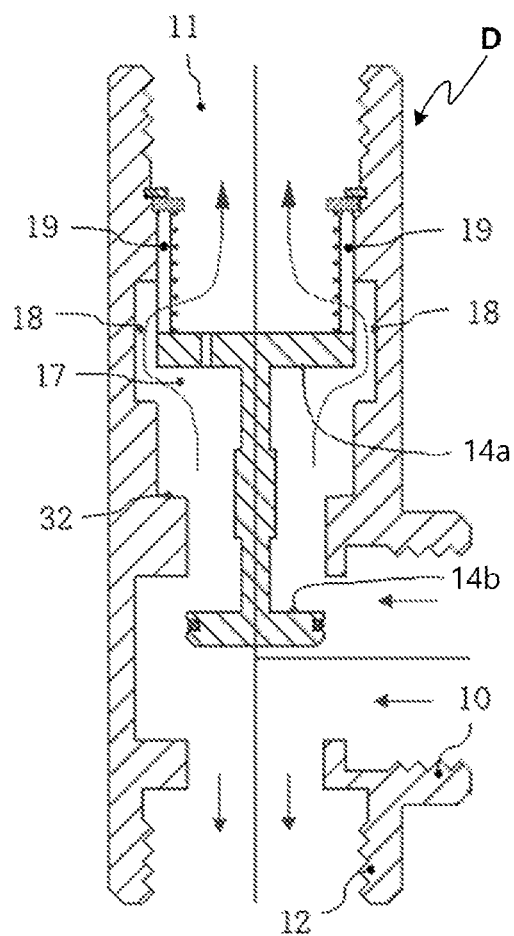
Figure 17:
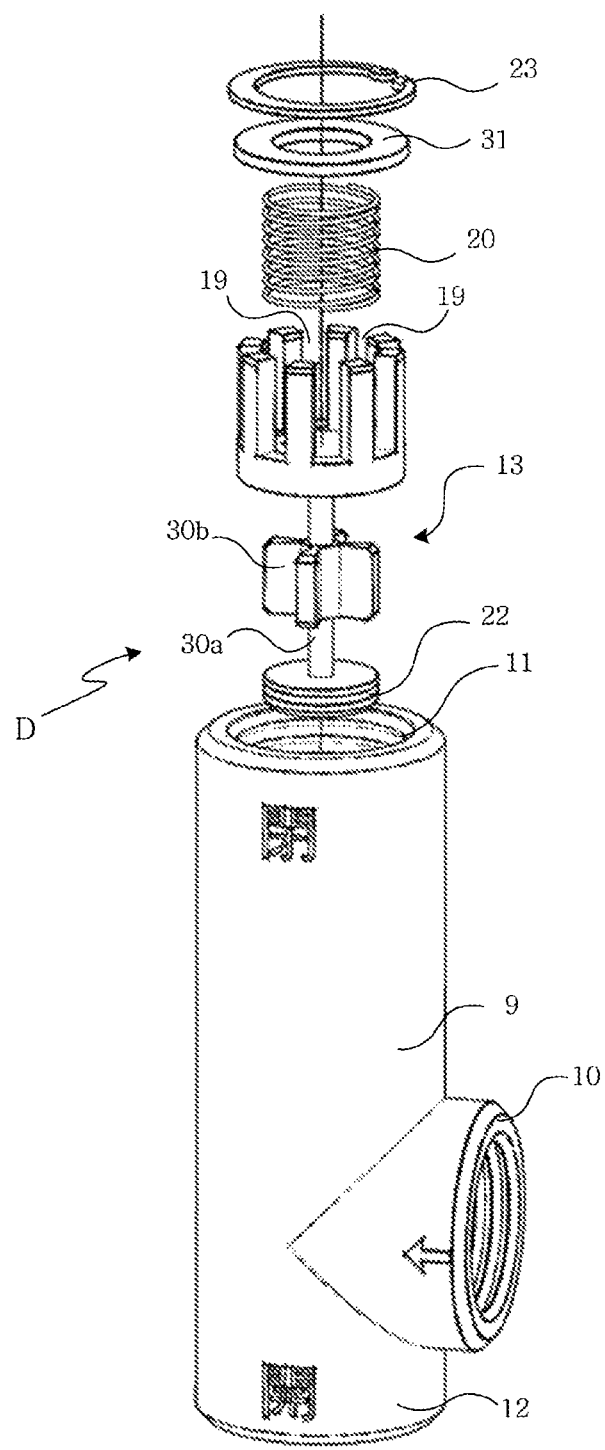
FIG. 17 is an exploded perspective view illustrating the branch tee in FIG. 14.

Hereinafter, a branch tee for sprinkler pipes according to a fourth embodiment of the present invention will be described with reference to FIGS. 14 to 17. Here, FIG. 14 is a perspective view illustrating the branch tee for sprinkler pipes according to the fourth embodiment of the present invention, FIGS. 15A and 15B are longitudinal cut-away views of the branch tee in FIG. 14, FIGS. 16A and 16B are longitudinal cross-sectional views of the branch tee in FIG. 14, and FIG. 17 is an exploded perspective view of the branch tee in FIG. 14. Different points from the first embodiment (refer to FIGS. 2 to 7) will be mainly described for convenience of description.

As illustrated in FIGS. 14 to 17, an inlet 10 connected to a water supply pipe is disposed on a sidewall of the branch tee body 9. Accordingly, when fire extinguishing water is introduced into a branch tee D in a side direction, the fire extinguishing water is sprinkled through a closed sprinkler head disposed thereabove and an open sprinkler head disposed therebelow.

A piston valve 13 includes a main blocking member 14a covering an inside of the branch tee, which is adjacent to a first outlet 11, and a sub-blocking member 14b covering an inside of the branch tee, which is adjacent to the second outlet 12. For example, the main blocking member 14a and the sub-blocking member 14b may include disk plates disposed parallel to each other, and the disk plates may be coupled to each other through a connecting member 30a such as a stick. The main blocking member 14a may have a surface area greater than that of the sub-blocking member 14b.

The main blocking member 14a is prevented from moving further downwards by a projection 32 protruding from an inner wall of the branch tee body 9. The sub-blocking member 14b is inserted through a space defined by the projection 32 to cover the second outlet 12. A guide member 30b assisting a smooth repetition movement of the piston valve 13 is provided on an outer circumferential surface of the connecting member 30a. For example, the guide member 30b may have a shape of a plurality of blades.

A spring stopper 31 may be provided as an independent member and inserted through the first outlet 11 instead of being fixed to the branch tee body 9. A snap ring 23 for preventing the piston valve 13 and the spring stopper 31 from being separated may be disposed above the spring stopper 31. Referring to FIG. 17, when the piston valve 13, the spring 20, the spring stopper 31, and the snap ring 23 are sequentially inserted through the first outlet 11 of the branch tee body 9 and then assembled, the branch tee D according to the embodiment may be easily assembled.

Figure 18A:
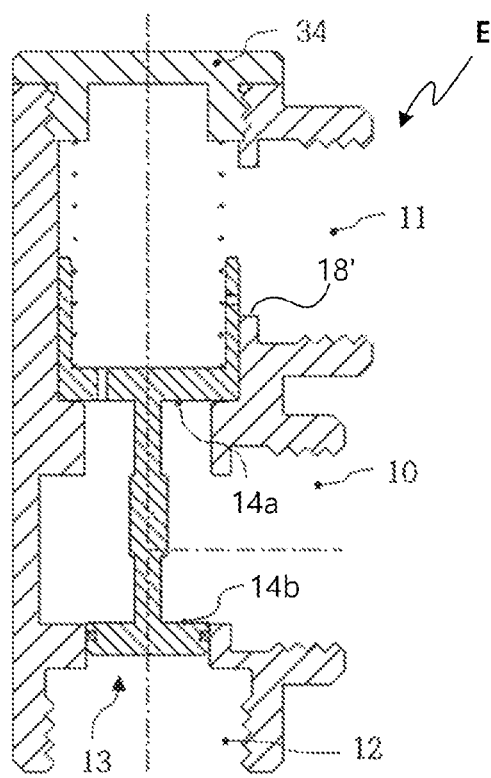
FIGS. 18A and 18B, which are modified examples of FIGS. 16A and 16B, are longitudinal cross-sectional views illustrating a branch tee for sprinkler pipes according to a fifth embodiment of the present invention.
Figure 18B:
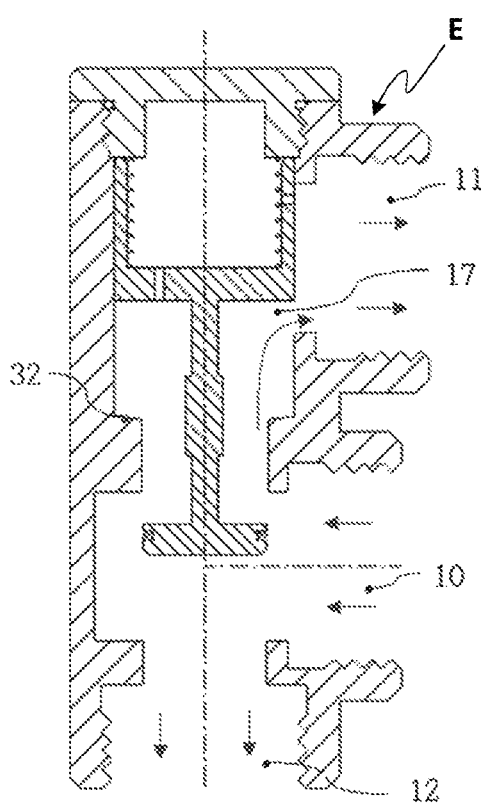

Hereinafter, a branch tee for sprinkler pipes according to a fifth embodiment of the present invention will be described with reference to FIGS. 18A and 18B. FIGS. 18A and 18B, which are modified examples of FIGS. 16A and 16B, are longitudinal cross-sectional views illustrating the branch tee for sprinkler pipes according to the fifth embodiment of the present invention. Different points from the fourth embodiment (refer to FIGS. 14 to 17) will be mainly described for convenience of description.

In case of a branch tee E according to the embodiment, a first outlet 11, which is connected to the closed sprinkler head, is disposed on a sidewall of one end of a branch tee body 9. Preferably, the first outlet 11 may overlap an inner wall groove 18. In the embodiment, when a piston valve 13 moves upwards in case of fire occurrence, since an opening 17 of a piston valve 13 is directly connected to the first outlet 11, fire extinguishing water may be more smoothly transferred to the first outlet 11. Although the inner wall groove is not additionally defined in an inner circumferential surface of the branch tee body 9 in the embodiment, the first outlet 11 or a passage 18' connected to the first outlet 11 may correspond to the inner wall groove 18. Reference numeral 34 that is not described in FIGS. 18A and 18B is a branch tee cap.

Figure 19:
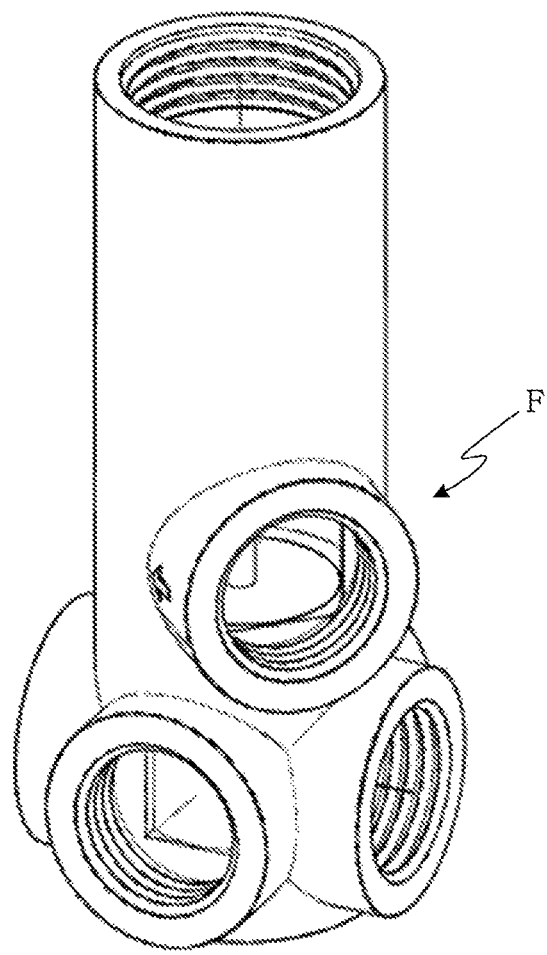
FIG. 19 is a perspective view illustrating a branch tee for sprinkler pipes according to a sixth embodiment of the present invention.
Figure 20A:
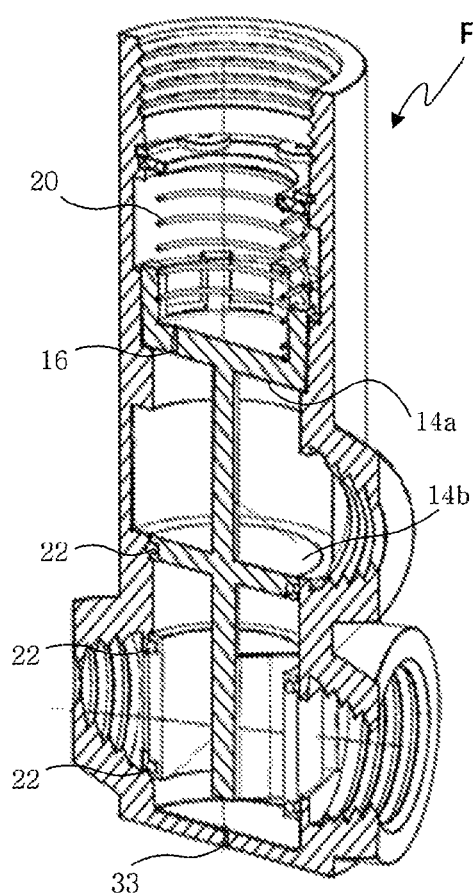
FIGS. 20A and 20B are longitudinal cut-away views illustrating the branch tee in FIG. 19.
Figure 20B:
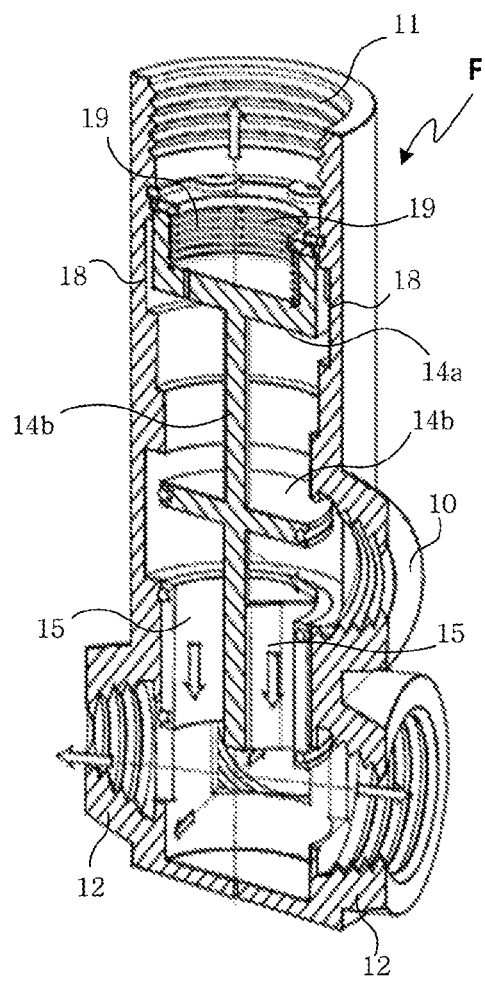
Figure 21A:
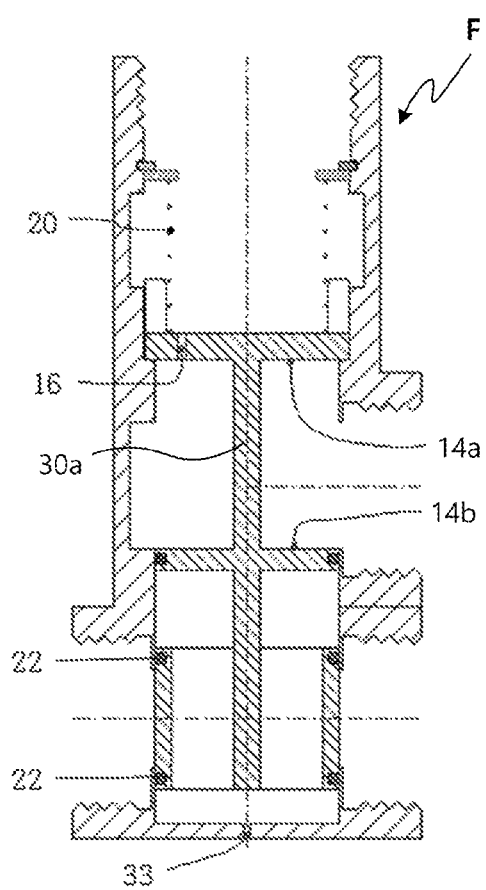
FIGS. 21A and 21B are longitudinal cross-sectional views illustrating the branch tee in FIG. 19.
Figure 21B:
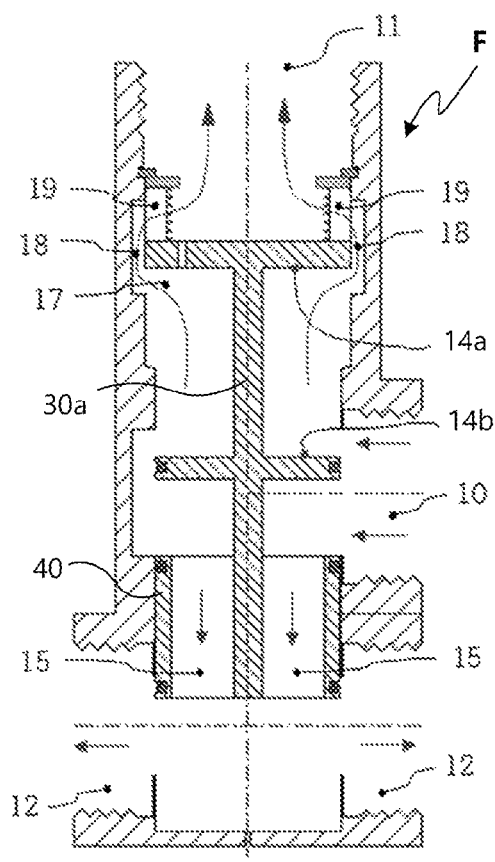
Figure 22:
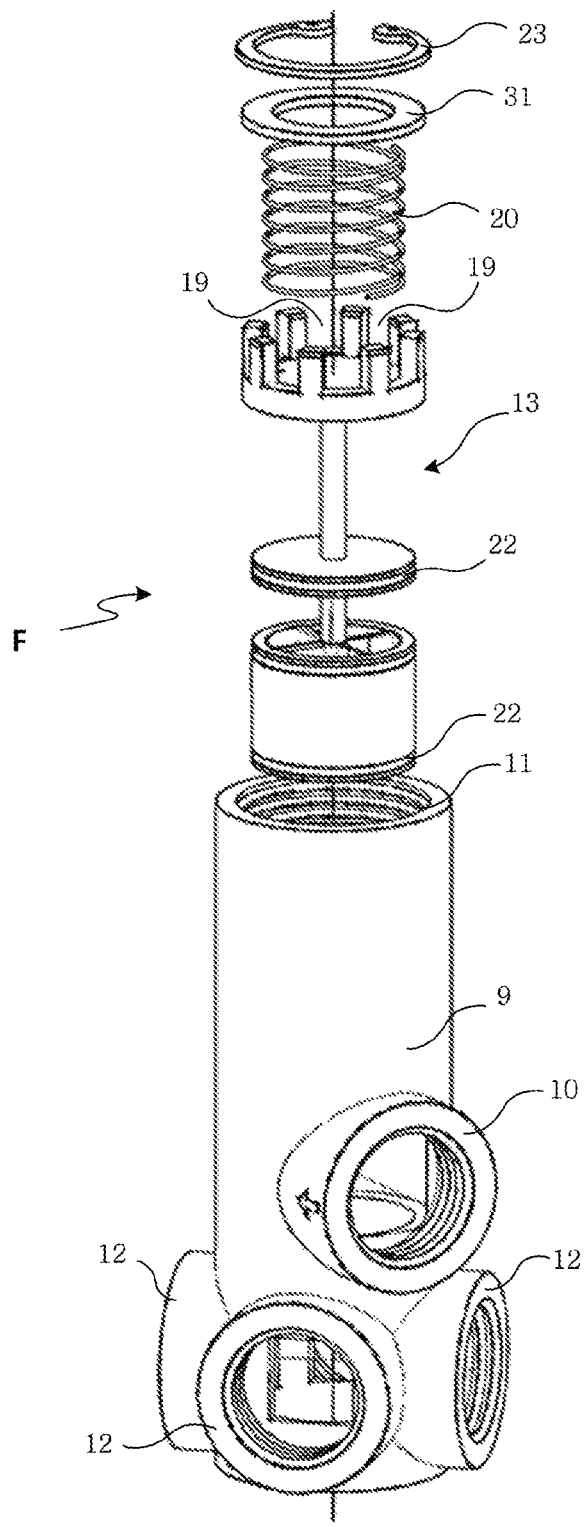
FIG. 22 is an exploded perspective view illustrating the branch tee in FIG. 19.

Hereinafter, a branch tee for sprinkler pipes according to a sixth embodiment of the present invention will be described with reference to FIGS. 19 to 22. Here, FIG. 19 is a perspective view illustrating the branch tee for sprinkler pipes according to the sixth embodiment of the present invention, FIGS. 20A and 20B are longitudinal cut-away views illustrating the branch tee in FIG. 19, FIGS. 21A and 21B are longitudinal cross-sectional views illustrating the branch tee in FIG. 19, and FIG. 22 is an exploded perspective view illustrating the branch tee in FIG. 19. Different points from the fourth embodiment (refer to FIGS. 14 to 17) will be mainly described for convenience of description.

As illustrated in FIGS. 19 to 22, a branch tee F for sprinkler pipes according to the embodiment includes a plurality of second outlets 12 disposed on a sidewall of a branch tee body 9. Although four second outlets 12 are exemplarily described in the embodiment, the embodiment of the present invention is not limited to the number of the second outlets 12.

Also, although a piston valve 13 according to the embodiment has the substantially same function as the third embodiment, the shape thereof is slightly modified. That is, a connecting member 30a extends below a sub-blocking member 14b, and an additional blocking member 40 is coupled to the connecting member 30a below the sub-blocking member 14b. The additional blocking member 40 has a cylindrical shape and defines a flow path 15 therein.

Accordingly, the sub-blocking member 14b serves to cover between the inlet 10 and the second outlet 12, and the additional blocking member 40 serves to directly cover the second outlet 12.

Reference numeral 33 that is not described in FIGS. 20A, 20B, 21A and 21B is a micro through-hole for water discharging.

Hereinafter, an example of applying the sprinkler pipe system according to the present invention to a placing having many obstacles to sprinkling water will be described with reference to FIGS. 23 and 24. Here, FIG. 23 is a piping diagram illustrating a sprinkler pipe system according to embodiments of the present invention, and FIG. 24 is a view illustrating a state in which ceiling heights between the sprinkler pipe system in FIG. 23 and pipe system according to a prior art are compared.

Figure 23:
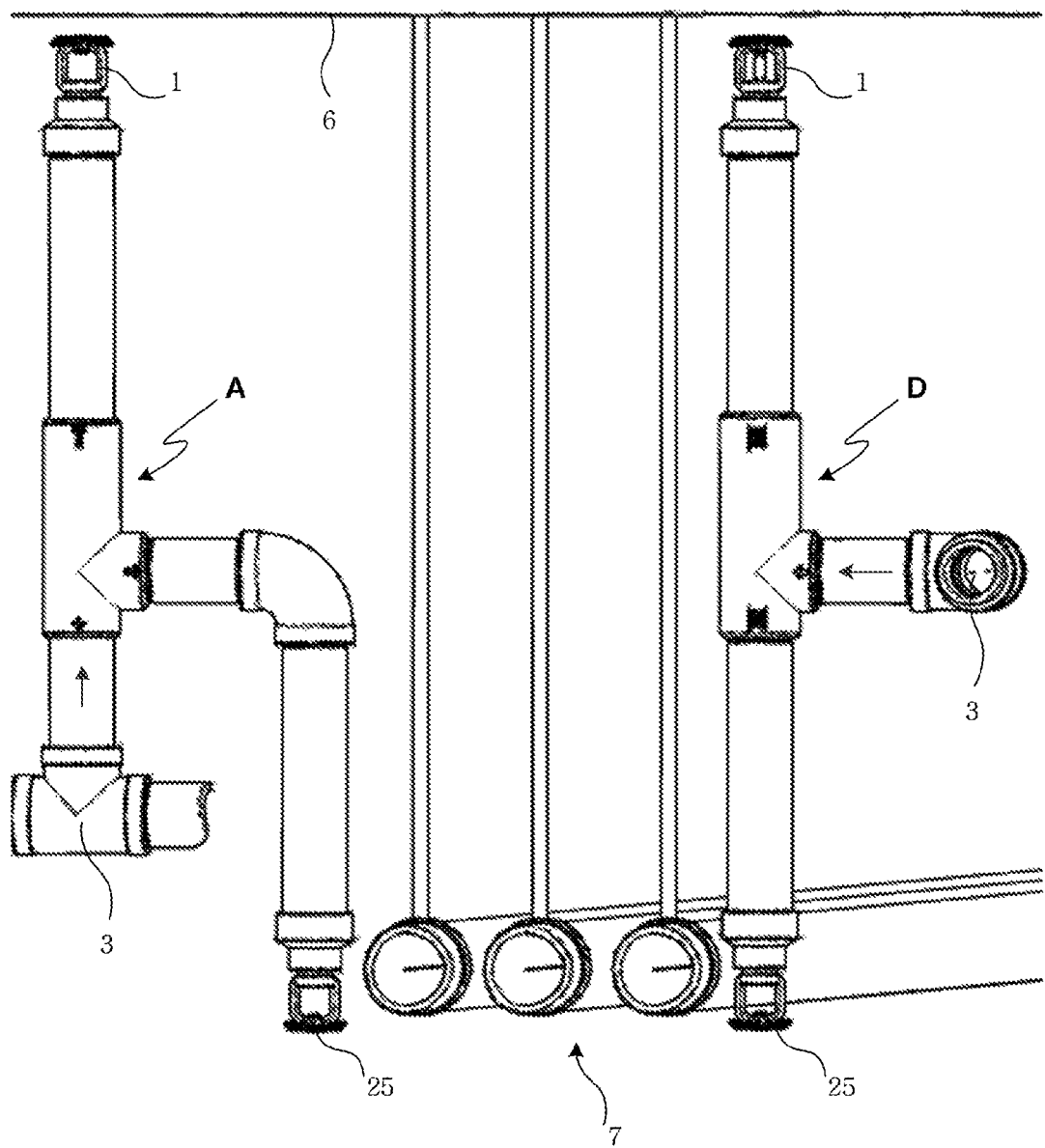
FIG. 23 is a piping diagram illustrating a sprinkler pipe system according to embodiments of the present invention.

As illustrated in FIG. 23, in the embodiment, an example of design of a sprinkler pipe system to which the branch tee A and the branch tee D are applied. When there is the obstacle to sprinkling water, e.g., all sorts of pipes and a cable tray like an underground parking lot, a minimum ceiling height is required under the law. Here, the ceiling height is defined as a height from a ground to ceiling facilities, i.e., the sprinkler pipe or sprinkler head. According to the present invention, although the downward open sprinkler head 25 is installed at the substantially same height as the obstacle to sprinkling water 7, the skipping effect does not occur, and furthermore, water sprinkling is not interfered by the obstacle to sprinkling water 7.

Figure 24:
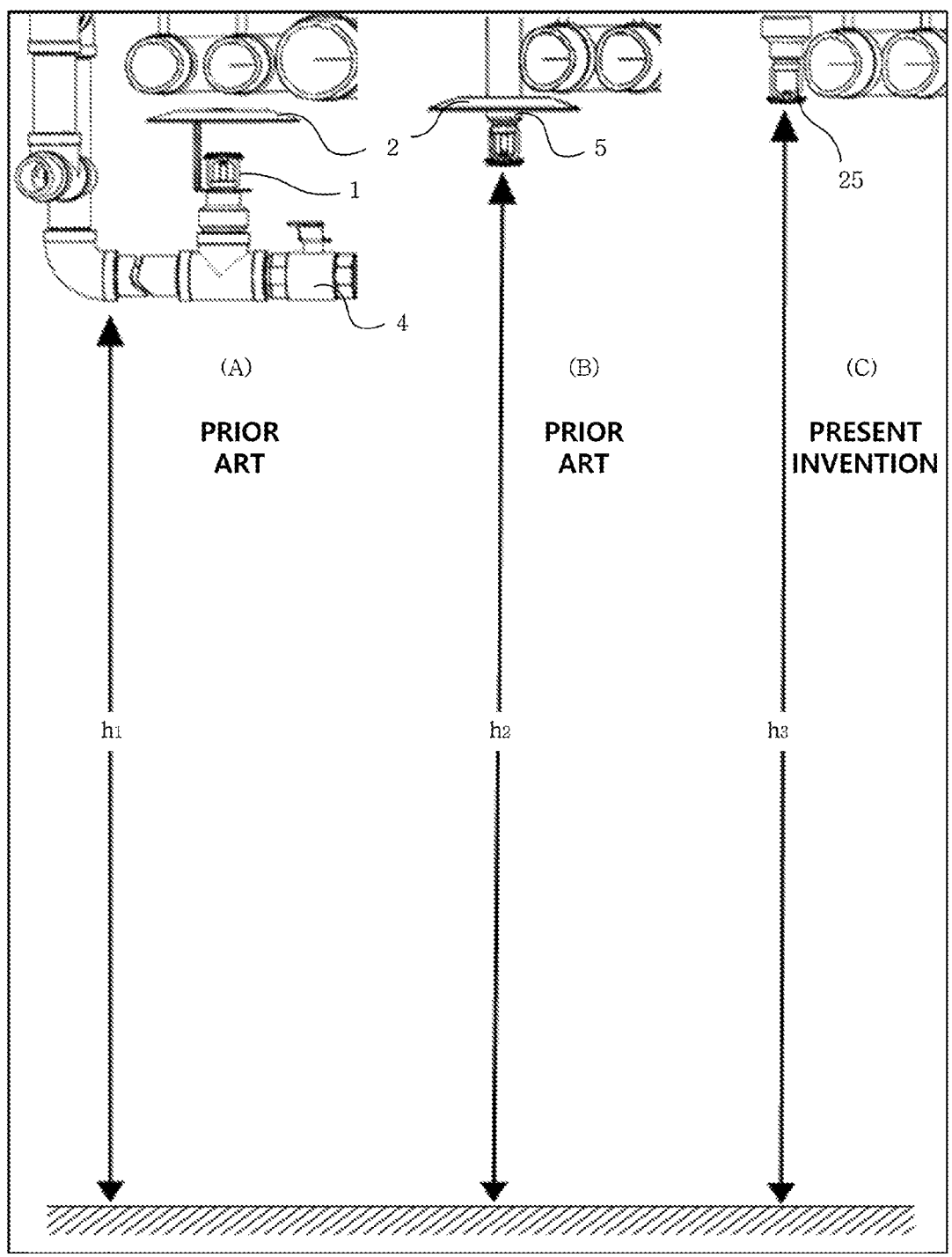
FIG. 24 is a view illustrating a state in which ceiling heights between the sprinkler pipe system in FIG. 23 and pipe systems according to a prior art are compared.

Referring to FIG. 24, when the upward head 1 and the drain valve 4 are installed in consideration of possibility of freezing of a typical sprinkler pipe, a ceiling height h1 is lowest (refer to (A)). Also, when a typical dry pendent head is used in piping (refer to (B)), although the downward head 5 may be used without possibility of freezing, the baffle plate 5 is used to prevent the skipping effect, and thus, a ceiling height h2 is second lowest. However, since the pipe system according to the present invention (refer to (C)) uses the open sprinkler head 25, the pipe system may not be affected by the skipping effect, and the baffle plate may be unnecessary, to secure a highest ceiling height h3. Furthermore, since the sprinkler head does not protrude from the obstacle to sprinkling water 7, an aesthetic appearance may be provided.

The description of the present invention is intended to be illustrative, and those with ordinary skill in the technical field of the present invention will be understood that the present invention can be carried out in other specific forms without changing the technical idea or essential features. Therefore, the above-disclosed embodiments are to be considered illustrative and not restrictive.

The invention claimed is:

1. A branch tee for sprinkler pipes, which automatically controls a water stream, comprising:
    a branch tee body having a cylindrical shape;
    a first outlet formed on one end of the branch tee body and configured to connect to a pipe of a closed sprinkler head;
    an inlet formed on the branch tee body and configured to connect to a water supply pipe;
    a second outlet formed on the branch tee body and configured to connect to a pipe of an open sprinkler head; a piston valve located in an inside of the branch tee body, and configured to control opening and closing of each of the first outlet and the second outlet while moving, between a first position and a second position in the branch tee body, in a longitudinal direction of the branch tee body; and
    an inner wall groove formed on an inner surface of the branch tee body and located adjacent the first outlet,
    wherein the piston valve comprises:

an upper portion having a cavity surrounded by an inner surface of the piston valve, a main blocking member blocking one end of the cavity, and a first opening formed on the inner surface of the piston valve; and a lower portion having a connecting member extended from the main blocking member and a sub-blocking member formed on an end of the connecting member, and wherein when the piston valve is located in the first position, a first path for the water stream to the first outlet is formed through the inlet, around an outer circumferential surface of the connecting member, through the inner wall groove, the first opening, and the first outlet, and a second path for the water stream to the second outlet is formed through the inlet and the second outlet, and when the piston valve is located in the second position, the first path is closed by the main blocking member and the second path is closed by the sub-blocking member.

2. The branch tee of claim 1, wherein, when the closed sprinkler head is opened, the piston valve moves towards the first position due to the fluid pressure difference in the branch tee body.

3. The branch tee of claim 1, further comprising
a spring disposed between the first outlet and the main blocking member.

4. The branch tee of claim 1, further comprising
a through-hole formed on the main blocking member for pressure balance in the branch tee body.

5. The branch tee of claim 1, wherein the inlet is disposed on a sidewall of the branch tee body, and the second outlet is disposed on the other end of the branch tee body.

6. The branch tee of claim 1, wherein the sub-blocking member has a disk shape formed on the end of the connecting member and configured to close the second outlet when the piston valve is located on the second position.

7. A sprinkler pipe system comprising:
a water supply pipe;
a closed sprinkler head;
an open sprinkler head; and
a branch tee comprising:
a branch tee body having a cylindrical shape;
a first outlet formed on one end of the branch tee body and connected to the closed sprinkler head through a pipe of the closed sprinkler head;
an inlet formed on the branch tee body and connected to the water supply pipe;
a second outlet formed on the branch tee body and connected to the open sprinkler head through a pipe of the open sprinkler head;
a piston valve located in an inside of the branch tee body, and configured to control opening and closing of each of the first outlet and the second outlet while moving, between a first position and a second position in the branch tee body, in a longitudinal direction of the branch tee body due to a fluid pressure difference in the branch tee body;
an inner wall groove formed on an inner surface of the branch tee body and located adjacent the first outlet,
wherein the piston valve comprises:
an upper portion having a cavity surrounded by an inner surface of the piston valve, a main blocking member blocking one end of the cavity, a first opening formed on the inner surface of the piston valve; and a lower portion having a connecting member extended from the main blocking member and a sub-blocking member formed on an end of the connecting member, and
wherein when the piston valve is located in the first position, a first path for the water stream to the first outlet is formed through the inlet, around an outer circumferential surface of the connecting member, through the inner wall groove, the first opening, and the first outlet, and a second path for the water stream to the second outlet is formed through the inlet and the second outlet, and
when the piston valve is located in the second position, the first path is closed by the main blocking member and the second path is closed by the sub-blocking member.

* * * * *